(12) United States Patent
Qiu et al.

(10) Patent No.: US 12,028,477 B2
(45) Date of Patent: Jul. 2, 2024

(54) DISPLAY METHOD APPLIED TO ELECTRONIC DEVICE, GRAPHICAL USER INTERFACE, AND ELECTRONIC DEVICE

(71) Applicant: HUAWEI TECHNOLOGIES CO., LTD., Guangdong (CN)

(72) Inventors: Jianbin Qiu, Shenzhen (CN); Yuhua Guo, Shanghai (CN); Hongyuan Zhang, Shenzhen (CN); Wenhua Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 332 days.

(21) Appl. No.: 17/310,252

(22) PCT Filed: Dec. 13, 2019

(86) PCT No.: PCT/CN2019/125006
§ 371 (c)(1),
(2) Date: Jul. 27, 2021

(87) PCT Pub. No.: WO2020/155875
PCT Pub. Date: Aug. 6, 2020

(65) Prior Publication Data
US 2023/0269324 A1   Aug. 24, 2023

(30) Foreign Application Priority Data

Jan. 28, 2019   (CN) .......................... 201910084914.3

(51) Int. Cl.
*G09G 5/00*    (2006.01)
*G06F 3/04847* (2022.01)
*H04M 1/72469* (2021.01)

(52) U.S. Cl.
CPC .... *H04M 1/72469* (2021.01); *G06F 3/04847* (2013.01)

(58) Field of Classification Search
None
See application file for complete search history.

(56) References Cited

U.S. PATENT DOCUMENTS

| 7,587,683 B2 * | 9/2009 | Ito ..................... H04M 1/72469 715/857 |
| 7,957,590 B2 * | 6/2011 | Watanabe ................ H04N 1/60 382/167 |

(Continued)

FOREIGN PATENT DOCUMENTS

| CN | 104679390 A | 6/2015 |
| CN | 104765437 A | 7/2015 |

(Continued)

OTHER PUBLICATIONS

Smart Tech Knigh et al., "Huawei Mate 20 ultra-practical game skills collection, quickly collect",Nov. 12, 2018, total:11pages.

(Continued)

*Primary Examiner* — Tuan A Tran
(74) *Attorney, Agent, or Firm* — WOMBLE BOND DICKINSON (US) LLP

(57) ABSTRACT

A display method applied to an electronic device, a graphical user interface, and an electronic device are provided. The electronic device may perform, based on a most power saving display color of a display, color transformation on an interface element to be displayed on the display, so as to change a color of the interface element to be displayed on the display, thereby reducing power consumption of the display. In addition, in a color transformation process, color fidelity is performed on an interface element that includes rich information, so that rich meanings represented by the interface element can be preserved. In addition, different color transformations are performed on drawing elements that constitute the interface element and that are used as the foreground and the background, so as to distinguish between (Continued)

the foreground and the background that are adjacent to each other and that are obtained after the color transformations.

21 Claims, 15 Drawing Sheets

(56) References Cited

U.S. PATENT DOCUMENTS

| | | | | |
|---|---|---|---|---|
| 8,539,361 | B2* | 9/2013 | Hardy | G06Q 10/107 |
| | | | | 715/752 |
| 8,674,934 | B2* | 3/2014 | Kim | G06F 1/1694 |
| | | | | 345/1.3 |
| 8,924,894 | B1* | 12/2014 | Yaksick | G06F 3/0488 |
| | | | | 715/863 |
| 9,110,589 | B1* | 8/2015 | Yaksick | G06F 3/04886 |
| 9,706,400 | B2* | 7/2017 | Nielsen | H04W 12/06 |
| 10,810,326 | B2* | 10/2020 | Wu | G06F 9/451 |
| 10,901,532 | B2* | 1/2021 | Akitomo | G06F 3/0412 |
| 11,003,304 | B2* | 5/2021 | Miyazaki | G06F 3/0485 |
| 11,079,900 | B2* | 8/2021 | Yeo | G06F 3/0481 |
| 2010/0085289 | A1 | 4/2010 | Munteanu et al. | |
| 2013/0063496 | A1 | 3/2013 | Basler et al. | |
| 2014/0320516 | A1* | 10/2014 | Son | G06F 3/04817 |
| | | | | 345/589 |
| 2016/0247437 | A1 | 8/2016 | Choi et al. | |

FOREIGN PATENT DOCUMENTS

| | | |
|---|---|---|
| CN | 105278811 A | 1/2016 |
| CN | 106817753 A | 6/2017 |
| CN | 106855797 A | 6/2017 |
| CN | 106873755 A | 6/2017 |
| CN | 108052367 A | 5/2018 |
| CN | 108174436 A | 6/2018 |
| IN | 109857401 A | 6/2019 |

OTHER PUBLICATIONS

Mengmeng chatting gossip et al.,"The new power-saving mode of Huawei mobile phones does not affect the running speed and can make your mobile phone use one more day",Published: Nov. 13, 2018,total:1page,link: https://haokan.baidu.com/v?pd=wisenaturalandvid=3535037957882192473.
WebAIM, Contrast Checker, https://webaim.org/resources/contrastchecker/, 2 pages.

* cited by examiner

DISPLAY METHOD APPLIED TO ELECTRONIC DEVICE, GRAPHICAL USER INTERFACE, AND ELECTRONIC DEVICE This application is a national stage of International Application No. PCT/CN2019/125006, filed on Dec. 13, 2019, which claims priority to Chinese Patent Application No. 201910084914.3, filed on Jan. 28, 2019. Both of the aforementioned applications are hereby incorporated by reference in their entireties.

TECHNICAL FIELD

This application relates to the field of electronic technologies, and in particular, to a display method applied to an electronic device, a graphical user interface, and an electronic device.

BACKGROUND

Power consumption of a display of an electronic device (such as a smartphone or a tablet computer) is related to brightness of the display. Higher brightness indicates higher power consumption. In addition to the brightness, the power consumption of the display is also related to a display color of the display. Different types of displays may have different most power saving display colors and different most power consuming display colors. For example, for a light emitting diode (LED) display and an organic light emitting diode (OLED) display of a general smartphone, most power consuming display colors are white and blue, and most power saving display colors are black, green, and red. However, a most power saving color of a twisted nematic (TN) display is white, because a voltage applied to the liquid crystal in this case is the lowest and light is fully transmitted. Power consumption generated when an electronic device displays a user interface is a concern of people.

SUMMARY

An objective of this application is to provide a display method applied to an electronic device, a graphical user interface, and an electronic device, so as to change a display color when the electronic device displays a user interface, thereby reducing power consumption.

The foregoing objective and another objective may be achieved by using features in the independent claims. Further implementations are reflected in the dependent claims, this specification, and the accompanying drawings.

According to a first aspect, a display method applied to an electronic device is provided. The electronic device has a display. The method may include: When a first display mode is enabled, for a drawing element to be displayed on the display, the electronic device may determine whether to perform color transformation on the drawing element; and if color transformation needs to be performed, the electronic device may perform color transformation on the drawing element based on a first reference color and a second reference color, where a color of the drawing element that is used as the background and on which color transformation needs to be performed may be transformed into a first color area, and a color difference between a color in the first color area and the first reference color does not exceed a first value; or a color of the drawing element that is used as the foreground and on which color transformation needs to be performed may be transformed into a second color area, and a color difference between a color in the second color area and the second reference color does not exceed a second value. After performing color transformation, the electronic device may display the element on the display. If color transformation needs to be performed on the drawing element, a color of the drawing element displayed on the display is a color obtained after the transformation.

The first display mode is "Power saving skin" mentioned in the embodiments.

The second reference color is different from the first reference color. Therefore, the electronic device may perform different color transformations on drawing elements used as the foreground and the background, so as to distinguish between the foreground and the background that are adjacent to each other and that are obtained after the color transformations. For example, the drawing element used as the background is transformed into black, and the drawing element used as the foreground is transformed into light gray.

The color transformation may be linear transformation. This can avoid loss of color and color difference information. Descriptions are provided in the following embodiments.

With reference to the first aspect, in an embodiment, the electronic device may determine the first reference color based on a physical feature of the display. The first reference color may be a most power saving color of the display or a color close to the most power saving display color. Herein, the color close to the most power saving display color may be limited by using a condition that a color difference between the color and the most power saving color does not exceed a preset threshold. In this way, a display color of an interface element of which a large area is used as the background on the display is transformed into the most power saving color of the display or the color close to the most power saving color. This can reduce power consumption of the display.

With reference to the first aspect, in an embodiment, the electronic device determines, based on a basic feature parameter (for example, a size or a color) of the drawing element, whether to perform color transformation may include but is not limited to the following manners:

Manner 1: If a size of the drawing element is less than a first size, the electronic device may determine to perform color fidelity on the drawing element; otherwise, the electronic device may determine to perform color transformation on the drawing element. A value of the first size is not limited in this application.

Manner 2: If the drawing element has a color in a color fidelity area, the electronic device may determine to perform color fidelity on the drawing element; otherwise, the electronic device may determine to perform color transformation on the drawing element. Herein, the color fidelity area may be a preset color set, for example, a set including colors other than black, white, and gray. A specification of the color fidelity area is not limited in this application.

Manner 3: If a quantity of colors of the drawing element exceeds a preset quantity, the electronic device may determine to perform color fidelity on the drawing element; otherwise, the electronic device may determine to perform color transformation on the drawing element. In this way, colors of an interface element including a drawing element with rich colors do not change, and rich information included in the rich colors of the interface element is not lost or changed. A value of the preset quantity is not limited in this application.

In an embodiment, if the drawing element is a geometric graph, Manner 1 may be used to determine whether to perform color transformation. For different geometric graphs, there may be different first sizes.

In an embodiment, if the drawing element is a picture, Manner 2 and/or Manner 3 may be used to determine whether to perform color transformation.

In an embodiment, if the drawing element is a picture, the electronic device may alternatively determine, in the following manner, whether to perform color transformation: If a proportion of transparent points in the picture exceeds a preset proportion (for example, 70%), the electronic device may determine to perform color transformation on the picture; otherwise, the electronic device may determine to perform color fidelity on the picture.

In an embodiment, if the drawing element is a text, Manner 2 and/or Manner 3 may be used to determine whether to perform color transformation, or it may be directly determined that color transformation needs to be performed on the text.

In the foregoing descriptions, using Manner 2 and Manner 3 means that, if the drawing element has a color in the color fidelity area, and the quantity of colors of the drawing element exceeds the quantity, the electronic device may determine to perform color fidelity on the drawing element; otherwise, the electronic device may determine to perform color transformation on the drawing element.

With reference to the first aspect, in an embodiment, the electronic device may determine, based on the feature parameter such as the size or the color of the drawing element, whether the drawing element is used as the foreground or the background.

In an embodiment, if the drawing element is a geometric graph, the electronic device may determine, based on a size of the geometric graph, whether the geometric graph is used as the foreground or the background. If the size of the geometric graph exceeds a second size, the electronic device may determine that the geometric graph is used as the background; otherwise, the electronic device may determine that the geometric graph is used as the foreground.

In an embodiment, a drawing element that is a text and a drawing element that is a picture usually each may be used as the foreground.

With reference to the first aspect, in an embodiment, before displaying the drawing element on the display, the electronic device may generate a drawing command used to draw the drawing element, and draw the drawing element according to the drawing command. The drawing command may carry drawing parameters such as a size, a style, and a color. These drawing parameters may be used by the electronic device (which may be a GPU in the electronic device) to draw the drawing element. For the drawing element on which color transformation needs to be performed, a drawing color indicated by a color parameter carried in the drawing command is a color of the drawing element obtained after the transformation; or for the drawing element on which color fidelity needs to be performed, a drawing color indicated by a color parameter carried in the drawing command is an original color of the drawing element.

With reference to the first aspect, in an embodiment, before determining whether to perform color transformation on the drawing element, the electronic device may detect a user operation used to enable "Power saving skin".

With reference to the first aspect, in an embodiment, the electronic device may display, on the display, a control for enabling "Power saving skin". The user operation used to enable "Power saving skin" is a user operation performed on the control. The control may be a plurality of options, and different options may represent different colors. The first reference color and/or the second reference color may be a color corresponding to an option selected by a user from the plurality of options.

According to a second aspect, an electronic device is further provided. The electronic device may include an apparatus, and the apparatus may implement any possible implementation of the first aspect.

According to a third aspect, an electronic apparatus is further provided. The electronic apparatus has functions of implementing actual behavior of the electronic device in the foregoing method. The functions may be implemented by hardware, or may be implemented by hardware executing corresponding software. The hardware or the software includes one or more modules corresponding to the functions.

With reference to the third aspect, in an embodiment, the electronic apparatus may be a central processing unit (CPU) and/or a graphics processing unit (GPU).

According to a fourth aspect, a computer device is provided, including a memory, a processor, and a computer program that is stored in the memory and that can run on the processor. When the processor executes the computer program, the computer device is enabled to implement any possible implementation of the first aspect.

According to a fifth aspect, a computer program product including instructions is provided. When the computer program product is run on an electronic device, the electronic device is enabled to perform any possible implementation of the first aspect.

According to a sixth aspect, a computer-readable storage medium is provided, including instructions. When the instructions are run on an electronic device, the electronic device is enabled to perform any possible implementation of the first aspect.

BRIEF DESCRIPTION OF DRAWINGS

To describe technical solutions in the embodiments of this application more clearly, the following describes the accompanying drawings required for the embodiments of this application.

FIG. 3A-1 and FIG. 3A-2, and FIG. 3B are schematic diagrams of UIs for enabling "Power saving skin" on an electronic device according to another two embodiments;

DESCRIPTION OF EMBODIMENTS

Figure 1A:
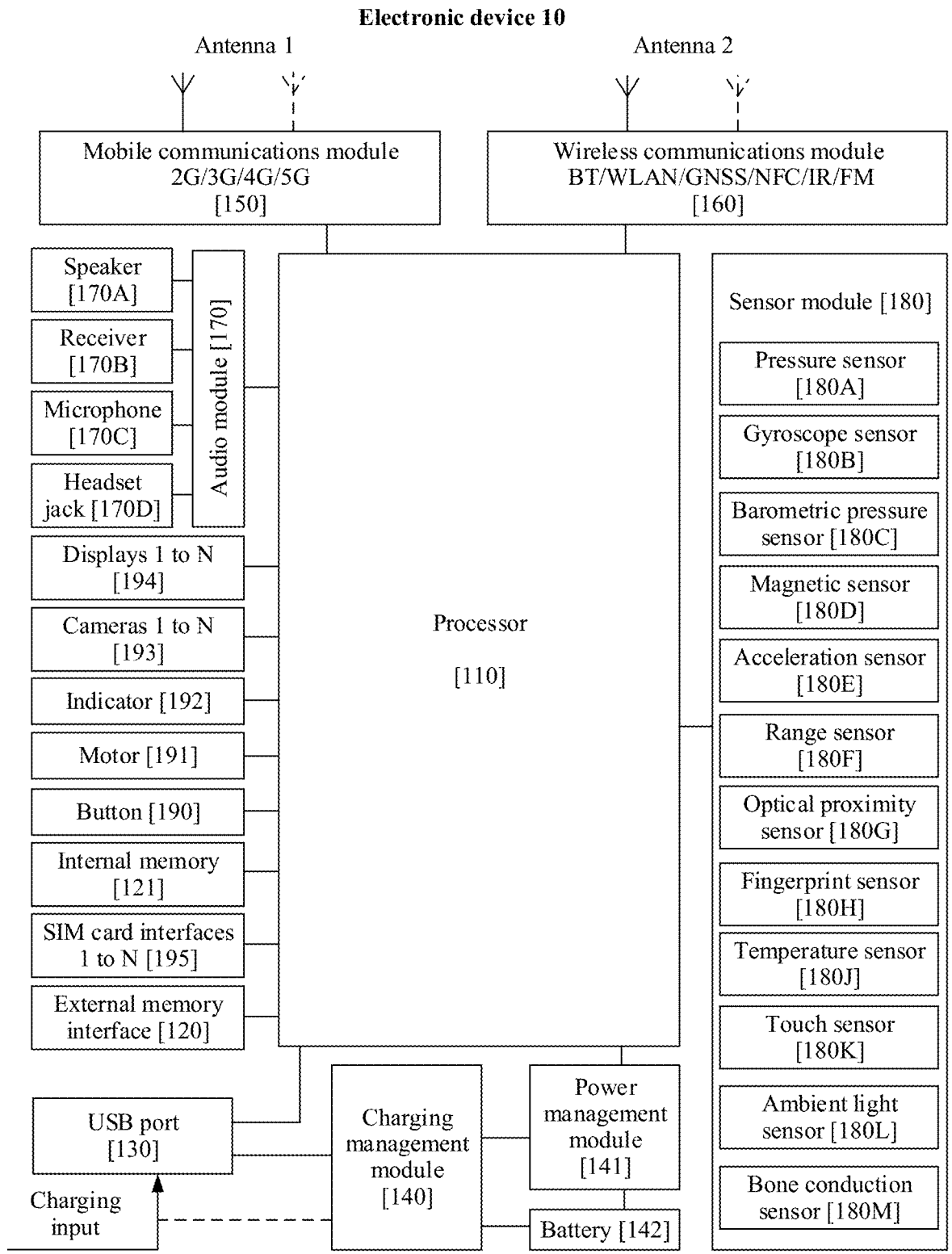
FIG. 1A is a schematic diagram of a structure of an electronic device according to an embodiment.

The terms used in the following embodiments of this application are merely intended to describe embodiments, but are not intended to limit this application. The terms "one", "a", "the", "the foregoing", "this", and "the one" of singular forms used in this specification and the appended claims of this application are also intended to include plural forms, unless otherwise specified in the context clearly. It should be further understood that the term "and/or" used in this application indicates and includes any or all possible combinations of one or more listed items.

The following describes an electronic device, a user interface used for such an electronic device, and embodiments for using such an electronic device. In some embodiments, the electronic device may be a portable electronic device that further includes other functions such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device using iOS®, Android®, Microsoft®, or another operating system. The portable electronic device may alternatively be another portable electronic device, for example, a laptop having a touch-sensitive surface or a touch panel. It should be further understood that, in some other embodiments, the electronic device may not be a portable electronic device, but a desktop computer having a touch-sensitive surface or a touch panel.

The term "user interface (UI)" in this specification, the claims, and the accompanying drawings of this application is a medium interface for interaction and information exchange between an application or an operating system and a user, and implements conversion between an internal form of information and a form that can be accepted by the user. A user interface of an application is source code written in a computer language such as Java or an extensible markup language (XML). The interface source code is parsed and rendered on the electronic device, and is finally presented as content that can be identified by the user, for example, a control such as a picture, a text, or a button. The control is also referred to as a widget, and is a basic element of the user interface. Typical controls include a toolbar, a menu bar, a text box, a button, a scrollbar, a picture, and a text. An attribute and content of the control in the interface are defined by using a tag or a node. For example, the XML specifies controls included in the interface by using nodes such as <Textview>, <ImgView>, and <VideoView>. One node corresponds to one control or one attribute in the interface. After being parsed and rendered, a node is presented as content visible for the user. In addition, interfaces of a plurality of applications including a hybrid application usually further include a web page. The web page, also referred to as a page, can be understood as a special control embedded in an application interface. The web page is source code written in a computer language, for example, a hypertext markup language (GTML), a cascading style sheet (CSS), or JavaScript (JS). A browser or a web page display component whose function is similar to that of a browser may load and display the web page source code as content that can be identified by the user. The content included in the web page is also defined by using a tag or a node in the web page source code. For example, the GTML defines an element and an attribute of the web page by using <p>, <img>, <video>, or <canvas>.

The user interface is usually represented in a form of a graphical user interface (GUI), and is a user interface that is related to a computer operation and that is displayed in a graphical manner. The user interface may be an interface element such as a window or a control displayed on a display of the electronic device, and the control may include a visual interface element such as an icon, a button, a menu, a list, a tab, a text box, a dialog box, a status bar, a navigation bar, or a widget. UI attributes such as a size, a style, and a color that are designed by a GUI designer for an interface element can be defined in the UI source code and a resource file of an application.

The electronic device may present an interface element in a user interface of an application by drawing one or more drawing elements such as a geometric graph, a text, and a picture. Herein, the application may include a launcher program. For example, for an application icon on a home screen (home), the electronic device may display the application icon by drawing the foreground picture that represents the icon. For another example, for a pop-up window, the electronic device may display the pop-up window by drawing a graph (a shape of the pop-up window), a picture (the background of the pop-up window), and a text (a text displayed in the pop-up window). Drawing a drawing element may include setting a color for the drawing element.

The following embodiments of this application provide a display method applied to an electronic device, a graphical user interface, and an electronic device, to change a color of an interface element displayed on a display of the electronic device. This can reduce power consumption of the electronic device.

In the following embodiments of this application, "Power saving skin" may be a function or a service provided by the electronic device such as a smartphone. When "Power saving skin" is enabled, the electronic device may perform color transformation on an interface element to be displayed on the display, to change a display color of the interface element, and display, on the display, the interface element obtained after the color transformation. In an embodiment, the electronic device may perform, based on a most power saving display color of the display, color transformation on the interface element to be displayed on the display, so that power consumption generated when the display displays the interface element obtained after the color transformation is less than power consumption generated when the display displays the interface element on which no color transformation is performed. How to perform color transformation on an interface element to be displayed on a display is described in detail in the following embodiments, and is not described herein.

In the following embodiments of this application, an interface element displayed on the display may include an interface element displayed when an application is displayed on the display in full screen. In this case, the interface element displayed on the display is from a user interface of the application. The interface element displayed on the display may also include an interface element displayed when a plurality of applications are stacked or tiled on the display. In this case, the interface element displayed on the display is from user interfaces of the plurality of applications.

Currently, there are some solutions for transforming a color of the interface element displayed on the display. One solution is to perform inverted rendering on the interface element displayed on the display. In this solution, inverted rendering is performed on all interface elements displayed on the display, which affects information or meanings presented by some interface elements by using original colors. For example, inverted rendering is performed on a white part and a black part of the human eyes, which violates an appearance presented by the human eyes in common sense. Another solution is to change a resource file (for example, a page layout file, or a picture, music, or a text referenced by the interface source code) to change a color, a style, or the like of the interface element displayed on the display. In this solution, a plurality of sets of resource files need to be configured for all applications. Still another solution is to compress color space to not display some original colors, so as to change the color of the interface element displayed on the display. For example, after the color space is compressed, a black-gray-white interface used for visual obstacle assistance is displayed.

In the display method applied to the electronic device provided in the following embodiments of this application, the electronic device may perform color fidelity (that is, not perform color transformation) on a drawing element that includes rich information (for example, rich colors), so that rich meanings represented by the drawing element can be preserved. In addition, the electronic device may perform different color transformations on drawing elements used as the foreground and the background, so as to distinguish between the foreground and the background that are adjacent to each other and that are obtained after the color transformations. For example, a drawing element used as the background is transformed into black, and a drawing element used as the foreground is transformed into light gray. The color transformation may be linear transformation, so as to avoid loss of color and color difference information. Descriptions are provided in the following embodiments.

In this application, "Power saving skin" may be referred to as a first display mode. "Power saving skin" is only a word used in the embodiments, a meaning represented by "Power saving skin" has been recorded in the embodiments, and a name of "Power saving skin" cannot constitute any limitation on the embodiments. In addition, in some other embodiments of this application, "Power saving skin" may also be referred to as another term such as "power saving theme" or "power saving mode".

An example electronic device 100 provided in the following embodiments of this application is first described.

FIG. 1A is a schematic diagram of a structure of the electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180G, a temperature sensor 180J, a touch sensor 180K, an ambient light sensor 180L, a bone conduction sensor 180M, and the like.

It can be understood that the structure shown in an embodiment of the present invention does not constitute a limitation on the electronic device 100. In some other embodiments of this application, the electronic device 100 may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (application processor, AP), a central processing unit (central processing unit, CPU), a graphics processing unit (graphics processing unit, GPU), a neural processing unit (neural-network processing unit, NPU), a modem processor, an image signal processor (image signal processor, ISP), a controller, a memory, a video codec, a digital signal processor (digital signal processor, DSP), or a baseband processor. Different processing units may be independent components, or may be integrated into one or more processors. In some embodiments, the electronic device 100 may alternatively include one or more processors 110.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving efficiency of the electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to: perform audio communication; and sample, quantize, and encode an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI may be configured to connect to the processor 110 and a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured through software. The GPIO interface may be configured as a control signal or a data signal. In some embodiments, the GPIO interface may be configured to connect to the processor 110, the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to USB standard specifications, and may be a mini USB port, a micro USB port, a USB type C port, or the like. The USB port 130 may be configured to connect to a charger to charge the electronic device 100, or may be configured to transmit data between the electronic device 100 and a peripheral device, or may be configured to connect to a headset to play audio through the headset, or may be configured to connect to another electronic device such as an AR device.

It can be understood that an interface connection relationship between the modules shown in an embodiment of the present invention is merely an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 100. When charging the battery 142, the charging management module 140 may further supply power to the electronic device through the power management module 141.

The power management module 141 is configured to connect to the battery 14, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed, to increase antenna utilization. For example, the antenna 1 may be multiplexed as a wireless local area network diversity antenna. In some other embodiments, an antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more devices integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation. For example, the wireless communications module 160 may include a Bluetooth module and a Wi-Fi module.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 may implement the display function through the GPU, the display 194, the application processor, and the like. The GPU is a microprocessor for image processing, and is connected to the display 194 and the application processor. The GPU is configured to: perform mathematical and geometric calculation, and perform graphics rendering. The processor 110 may include one or more GPUs that execute an instruction to generate or change display information.

The display 194 is configured to display an image, a video, and the like. The display 194 may include a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), Miniled, MicroLed, Micro-oLed, a quantum dot light emitting diode (quantum dot light emitting diodes, QLED), or the like. In some embodiments, the electronic device 100 may include one or N displays 194, where N is a positive integer greater than 1.

In some embodiments, after generating a drawing command used by a UI thread of an application to create an interface element, the CPU may transmit (or share) the drawing command to the GPU, and indicate the GPU to perform rendering according to the drawing command. Herein, the drawing command may be used to indicate how to draw a interface element in a user interface by using a drawing element such as a graph, a text, or a picture.

The electronic device 100 may implement a photographing function through the ISP, the camera 193, the video codec, the GPU, the display 194, the application processor, and the like. The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to the digital image signal, the digital signal processor may further process another digital signal. For example, when the electronic device 100 selects a frequency, the digital signal processor is configured to perform Fourier transform on frequency energy.

The video codec is configured to compress or decompress a digital video. The electronic device 100 may support one or more codecs. Therefore, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) calculation processor. The NPU quickly processes input information by referring to a biological neural network structure, for example, by referring to a mode of transfer between human brain neurons, and may further continuously perform self-learning. Intelligent cognition of the electronic device 100 such as image recognition, facial recognition, speech recognition, and text understanding can be implemented through the NPU.

The external memory interface 120 may be configured to connect to an external memory card such as a micro SD card, to extend a storage capability of the electronic device 100. The external memory card communicates with the processor 110 through the external memory interface 120, to implement a data storage function, for example, to store files such as music, photos, and videos in the external memory card.

The internal memory 121 may be configured to store one or more computer programs. The one or more computer programs include an instruction. The processor 110 may run the instruction stored in the internal memory 121, so that the electronic device 100 is enabled to perform photo preview methods applied to the electronic device provided in some embodiments of this application, other function applications, data processing, and the like. The internal memory 121 may include a program storage area and a data storage area. The program storage area may store an operating system. The program storage area may further store one or more applications (for example, Gallery and Contacts) and the like. The data storage area may store data (for example, a photo or a contact) or the like created during use of the electronic device 100. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function such as music playback or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or receives a voice message, the receiver 170B may be put close to the human ear to listen to the voice message.

The microphone 170C, also referred to as a "mike" or a "microphone", is configured to convert a sound signal into an electrical signal. When making a call or sending a voice message, a user may make a sound near the microphone 170C through the mouth of the user, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be a USB port 130, or may be a 3.5 mm open mobile terminal platform (Open Mobile Terminal Platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates made of conductive materials. A capacitance between electrodes changes when force is applied to the pressure sensor 180A. The electronic device 100 determines a pressure strength based on a capacitance change. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on an icon of "Messages", an instruction for viewing an SMS message is executed; or when a touch operation whose touch operation strength is greater than or equal to a first pressure threshold is performed on an icon of "Messages", an instruction for creating a new SMS message is executed.

The gyroscope sensor 180B may be configured to determine a motion posture of the electronic device 100. In some embodiments, an angular velocity of the electronic device 100 around three axes (that is, axes x, y, and z) may be determined through the gyroscope sensor 180B. The gyroscope sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and allows the lens to eliminate the jitter of the electronic device 100 through a reverse motion, to implement image stabilization. The gyroscope sensor 180B may be further used in a navigation scenario and a somatic game scenario.

The barometric pressure sensor 180C is configured to measure atmospheric pressure. In some embodiments, the electronic device 100 calculates an altitude through a barometric pressure value obtained by the barometric pressure sensor 180C through measurement, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip cover based on the magnetic sensor 180D, to set a feature such as automatic unlocking through flipping based on a detected opening or closing state of the flip cover or a detected opening or closing state of the flip cover.

The acceleration sensor 180E may detect acceleration values in various directions (usually on three axes) of the electronic device 100, and may detect a gravity value and a gravity direction when the electronic device 100 is still. The acceleration sensor 180E may be further configured to identify a posture of the electronic device, and is applied to applications such as a pedometer and switching between a landscape mode and a portrait mode.

The range sensor 180F is configured to measure a distance. The electronic device 100 may measure a distance in an infrared manner or a laser manner. In some embodiments, in a photographing scenario, the electronic device 100 may measure a distance through the range sensor 180F, to implement quick focusing.

The optical proximity sensor 180G may include, for example, a light emitting diode (LED) and an optical detector such as a photodiode. The light emitting diode may be an infrared light emitting diode. The electronic device 100 emits infrared light through the light emitting diode. The electronic device 100 detects infrared reflected light from a nearby object through the photodiode. When sufficient reflected light is detected, it may be determined that there is an object near the electronic device 100. When insufficient reflected light is detected, it may be determined that there is no object near the electronic device 100. The electronic device 100 may detect, through the optical proximity sensor 180G, that the user holds the electronic device 100 close to the ear for a call, to automatically turn off a screen for power saving. The optical proximity sensor 180G may also be used in a smart cover mode or a pocket mode to automatically unlock or lock the screen.

The ambient light sensor 180L is configured to sense ambient light luminance. The electronic device 100 may adaptively adjust luminance of the display 194 based on the sensed ambient light luminance. The ambient light sensor 180L may be further configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180G is configured to collect a fingerprint. The electronic device 100 may implement fingerprint-based unlocking, application lock access, fingerprint-based photographing, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor nearby the temperature sensor 180J, to reduce power consumption for thermal protection. In some other embodiments, when the temperature is less than another threshold, the electronic device 100 heats up the battery 142, to avoid abnormal shutdown of the electronic device 100 due to a low temperature. In some other embodiments, when the temperature is less than still another threshold, the electronic device 100 boosts an output voltage of the battery 142, to avoid abnormal shutdown due to a low temperature.

The touch sensor 180K may also be referred to as a touch panel or a touch-sensitive surface. The touch sensor 180K may be disposed on the display 194. The touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event, and provide a visual output related to the touch operation through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in a headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 receives a button input, and generates a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio play) may correspond to different vibration feedback effects. Touch operations performed on different areas on the display 194 may also correspond to different vibration feedback effects. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be configured to indicate a charging status and a power change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be simultaneously inserted into one SIM card interface 195. The plurality of cards may be of a same type or different types. The SIM card interface 195 may also be compatible with different types of SIM cards. The SIM card interface 195 may also be compatible with an external memory card. The electronic device 100 interacts with a network by using the SIM card, to implement functions such as calling and data communication. In some embodiments, the electronic device 100 uses an eSIM, that is, an embedded SIM card. The eSIM card may be embedded in the electronic device 100, and cannot be separated from the electronic device 100.

The electronic device 100 shown in FIG. 1A as an example may display, by using the display 194, user interfaces described in the following embodiments. The electronic device 100 may detect a touch operation in each user interface by using the touch sensor 180K, for example, a tap operation (for example, a touch operation or a double-tap operation on an icon) in each user interface, or an upward or a downward swipe operation or an operation of making a circle drawing gesture in each user interface. In some embodiments, the electronic device 100 may detect, by using the gyroscope sensor 180B, the acceleration sensor 180E, and the like, a motion gesture made by the user by holding the electronic device 100, for example, shaking the electronic device. In some embodiments, the electronic device 100 may detect a non-touch gesture operation by using the camera 193 (for example, a 3D camera or a depth camera).

A software system of the electronic device 100 may use a layered architecture, an event-driven architecture, a microkernel architecture, a micro service architecture, or a cloud architecture. In an embodiment of the present invention, an Android system with a layered architecture is used as an example to describe a software structure of the electronic device 100.

Figure 1B:
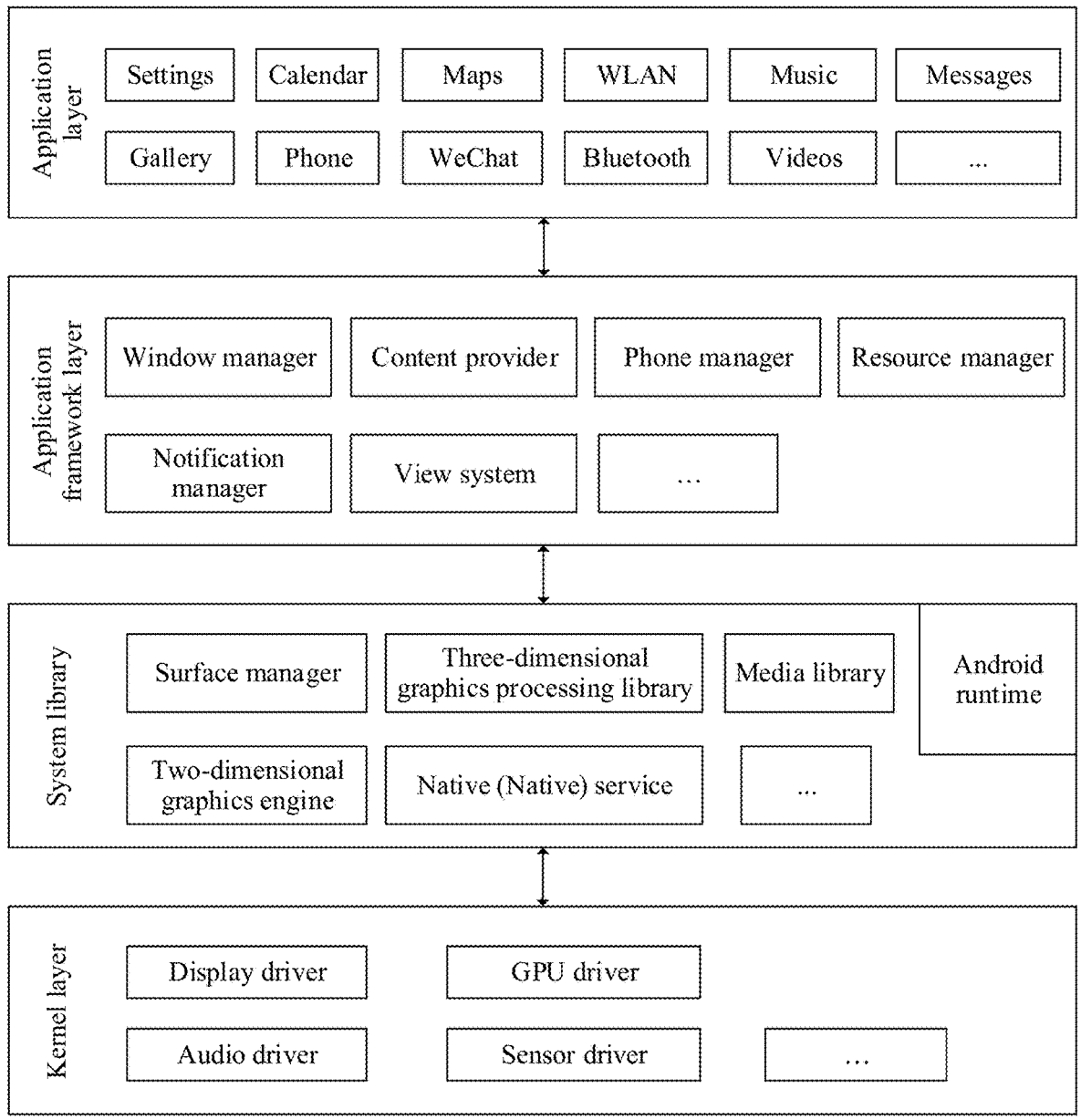
FIG. 1B is a schematic diagram of a software structure of an electronic device according to an embodiment.

FIG. 1B is a block diagram of the software structure of the electronic device 100 according to an embodiment of the application.

In the layered architecture, software is divided into several layers, and each layer has a clear role and task. The layers communicate with each other through software interfaces. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 1B, the application may include applications such as "Settings", "Gallery", "Calendar", "Phone", "Maps", "WeChat", "WLAN", "Bluetooth", "Music", "Videos", and "Messages".

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system may be configured to construct a user interface of an application. In an embodiment, after obtaining drawing data used by a UI thread of the application to construct the user interface, the view system may construct one or more visual interface elements in the user interface of the application based on the drawing data.

The phone manager is configured to provide a communication function of the electronic device 100, for example, management of a call status (including answering, declining, or the like).

The resource manager provides various resources for an application, such as a localized string, an icon, an image, a layout file, and a video file.

The notification manager enables an application to display notification information in a status bar, and may be configured to convey a notification message. The notification manager may automatically disappear after a short pause without requiring user interaction. For example, the notification manager is configured to notify download completion, provide a message notification, and the like. The notification manager may alternatively be a notification that appears in a top status bar of the system in a form of a graph or a scrollbar text, for example, a notification of an application running on the background or a notification that appears on a screen in a form of a dialog box. For example, text information is prompted in the status bar, an alert sound is produced, the electronic device vibrates, or an indicator light blinks.

The Android runtime includes a core library and a virtual machine. The Android runtime is responsible for scheduling and management of the Android system.

The core library includes two parts: a function that needs to be invoked in a java language and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), a 2D graphics engine (for example, SGL), and a native (Native) service.

The surface manager is configured to manage a display subsystem and provide fusion of 2D and 3D image layers for a plurality of applications.

The media library supports playback and recording in a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The native (Native) service may include some link libraries, and code of the native service is usually written in C or C++. Compared with Java code, the native service code can provide higher execution efficiency. The native service may communicate with the application through a Java native interface (Java native interface, JNI). The native service may call various hardware driver interfaces at the kernel layer to drive hardware to work.

The kernel layer is a layer between hardware and software. The kernel layer includes various hardware drivers, for example, a display driver, a GPU driver, a camera driver, an audio driver, and a sensor driver.

The following describes an example of a working procedure of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a touch touch operation, and a control corresponding to the touch operation is a control of a camera application icon. A camera application invokes an interface at the application framework layer to enable the camera application, then enables a camera driver by invoking the kernel layer, and captures a static image or a video by using the camera 193.

Figure 1C:
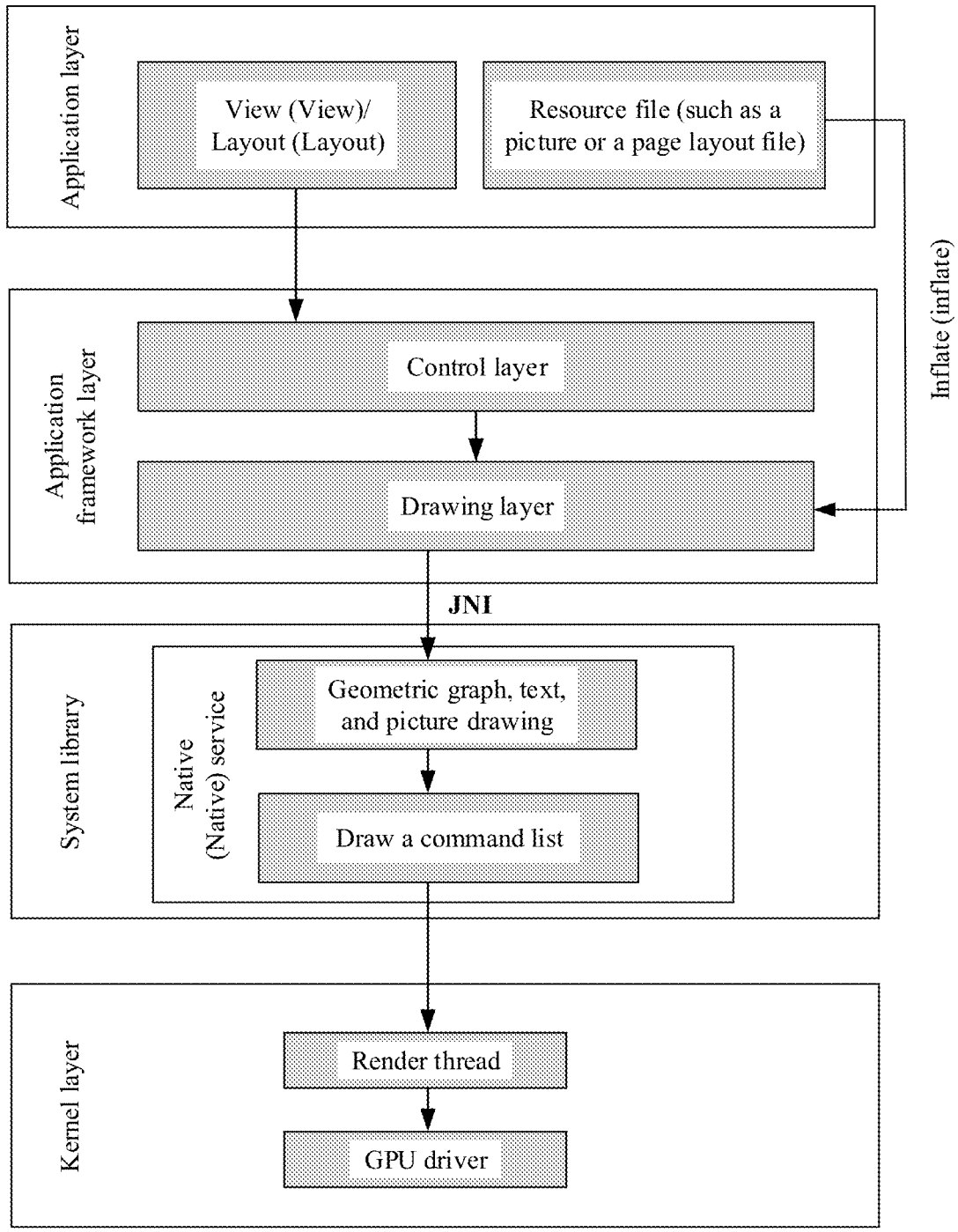
FIG. 1C is a schematic diagram of a software structure that relates to a display method according to an embodiment of this application.

FIG. 1C shows a software architecture involved in a display method applied to an electronic device according to an embodiment of the present invention. As shown in FIG. 1C, the descriptions are as follows:

An application at the application layer may create a user interface by invoking a view (view) interface provided in the application framework layer. The user interface generally may be parsed into two aspects: a view/layout and a resource file. Creating a user interface may include: creating an interface element, for example, a control such as an icon, a button, or a list; and setting, by using an XML resource file, a page layout and a resource such as a picture or text referenced by the interface element.

The application framework layer may be divided into a control layer and a drawing layer. The control layer may provide a rich and extensible view (view), and the view may be used to construct interface elements such as a list, a grid, a text box, and a button in a user interface. The drawing layer may decompose an interface element to be drawn by the upper-layer application into one or more of the following drawing elements: a geometric graph, a text, a picture, and the like, determine attributes such as sizes, styles, and colors of the drawing elements, and invoke a native service that is in the system library and that is used to draw these drawing elements.

The system library may provide a native service for drawing a drawing element, and the native service may include a native service for drawing a graph, a native service for drawing a text, a native service for drawing a picture, and the like. In addition, the native service may be further used to generate a drawing command and send the drawing command to a render thread at the kernel layer. All drawing commands used by the application to create the user interface can be buffered in a drawing command list. The drawing command may indicate a to-be-drawn object (such as a graph, a text, or a picture), a color, a style, and the like. In an embodiment, the native service that is in the system library and that is used to draw a drawing element may be used as follows: When "Power saving skin" is enabled, color transformation is performed on the drawing element, and a drawing command to be sent to the render thread at the kernel layer is generated, where the drawing command is used to indicate the render thread to draw the drawing element obtained after the color transformation, so as to change a color of an interface element to be drawn by the application. When "Power saving skin" is disabled, no color transformation is performed on the drawing element. In this case, a generated drawing command to be sent to the render thread at the kernel layer is used to indicate the render thread to perform rendering based on an original color of the drawing element. The original color of the drawing element may be defined in interface source code and a resource file of the application that are used for creating the user interface. For information about how to perform color transformation on a drawing element, refer to the following method embodiment of this application. Details are not described herein again.

The kernel layer may provide the render thread. The render thread can parse the drawing command and drive the GPU to perform rendering, so that the interface element to be drawn by the application is displayed finally.

It can be learned that, when "Power saving skin" is enabled, because a drawing color of the drawing element that is indicated in the drawing command is a color obtained after the color transformation, a color of the interface element of the application that is finally displayed through rendering by the GPU also changes, and a color of the interface element displayed on the display changes accordingly. In addition, because color transformation is performed in the system library, a color transformation function or service such as "Power saving skin" is at a system level and is applicable to various applications without a need of replacing a resource file, and therefore is widely used.

Figure 2A:
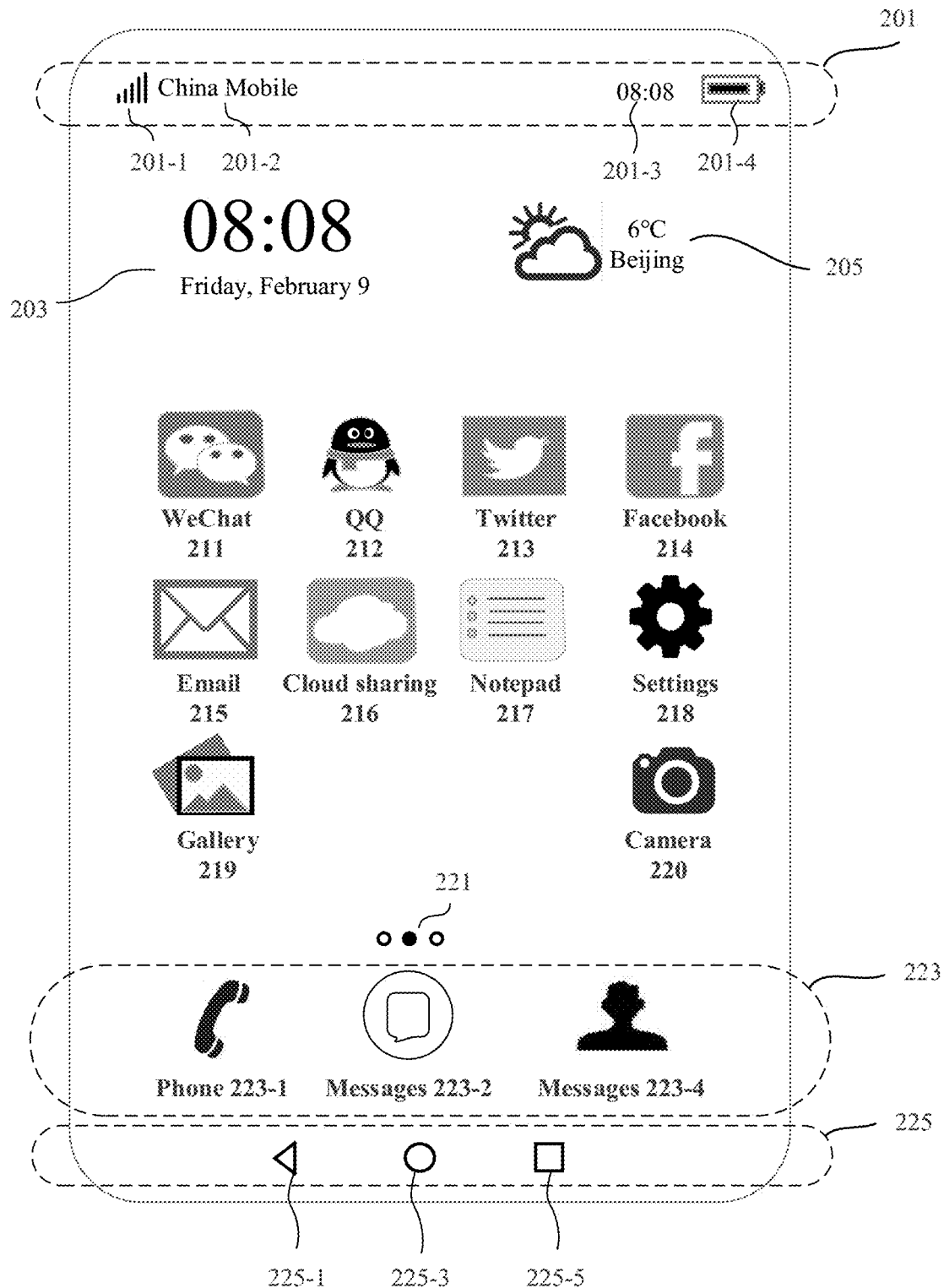
FIG. 2A is a schematic diagram of a user interface that is used for an application menu on an electronic device according to an embodiment.

FIG. 2A shows an example of a user interface 21 that is used for an application menu on the electronic device 100.

As shown in FIG. 2A, the user interface 21 may include a status bar 201, a tray 223 having commonly used application icons, a calendar indicator 203, a weather indicator 205, a navigation bar 225, and other application icons.

The status bar 201 may include one or more signal strength indicators 201-1 of a mobile communication signal (which may also be referred to as a cellular signal), an indicator 201-2 of an operator of the mobile communication signal, a time indicator 201-3, a battery status indicator 201-4, and the like.

The calendar indicator 203 may be used to indicate a current time, for example, a date, a day of a week, or hour minute information.

The weather indicator 205 may be used to indicate a weather type, for example, Clouds Early or Light Rain, and may be further used to indicate information such as a temperature. The tray 223 having commonly used application icons may display an icon 223-1 of "Phone", an icon 223-2 of "Messages", an icon 221-4 of "Contacts", and the like.

The navigation bar 225 may include system navigation buttons such as a back button 225-1, a home screen (Gome screen) button 225-3, and a menu button 225-5. When detecting that a user taps the back button 225-1, the electronic device 100 may display a previous page of a current page. When detecting that the user taps the home button 225-3, the electronic device 100 may display a home screen. When detecting that the user taps the menu button 225-5, the electronic device 100 may display a task last opened by the user. The navigation buttons may alternatively have other names. This is not limited in this application. In addition to a virtual button, each navigation button in the navigation bar 225 may also be implemented as a physical button.

The other application icons may include, for example, an icon 211 of "WeChat (Wechat)", an icon 212 of "QQ", an icon 213 of "Twitter (Twitter)", an icon 214 of "Facebook (Facebook)", an icon 215 of "Email", an icon 216 of "Cloud Sharing", an icon 217 of "Notepad", an icon 218 of "Settings", an icon 219 of "Gallery", and an icon 220 of "Camera". The user interface 21 may further include a page indicator 221. The other application icons may be distributed on a plurality of pages, and the page indicator 221 may be used to indicate a page on which an application is currently browsed by the user. The user may swipe left or right in an area of the other application icons, to browse an application icon on another page.

In some embodiments, the user interface 21 shown in FIG. 2A as an example may be a home screen (Gome screen).

In some other embodiments, the electronic device 100 may further include a home button. The home button may be a physical button, or may be a virtual button (for example, the button 225-3). The home button may be used to receive an instruction from the user, and return to the home screen from a currently displayed UI, so that the user can view the home screen at any time. The instruction may be an operation instruction of pressing the home button once by the user, or may be an operation instruction of consecutively pressing the home button twice by the user within a short time, or may be an operation instruction of touching and holding the home button by the user within a preset time. In some other embodiments of this application, a fingerprint recognizer may be further integrated into the home button, to perform fingerprint collection and recognition when the home button is pressed.

It can be understood that FIG. 2A merely shows an example of the user interface on the electronic device 100, and should not constitute a limitation on an embodiment of the application.

The electronic device 100 may support the user in enabling "Power saving skin" in "Settings (setting)". "Settings" is an application for setting hardware or software of the electronic device on the electronic device 100 such as a smartphone or a tablet computer. The application may be indicated by using the icon 218 in FIG. 2A.

Figures 1, 2B:
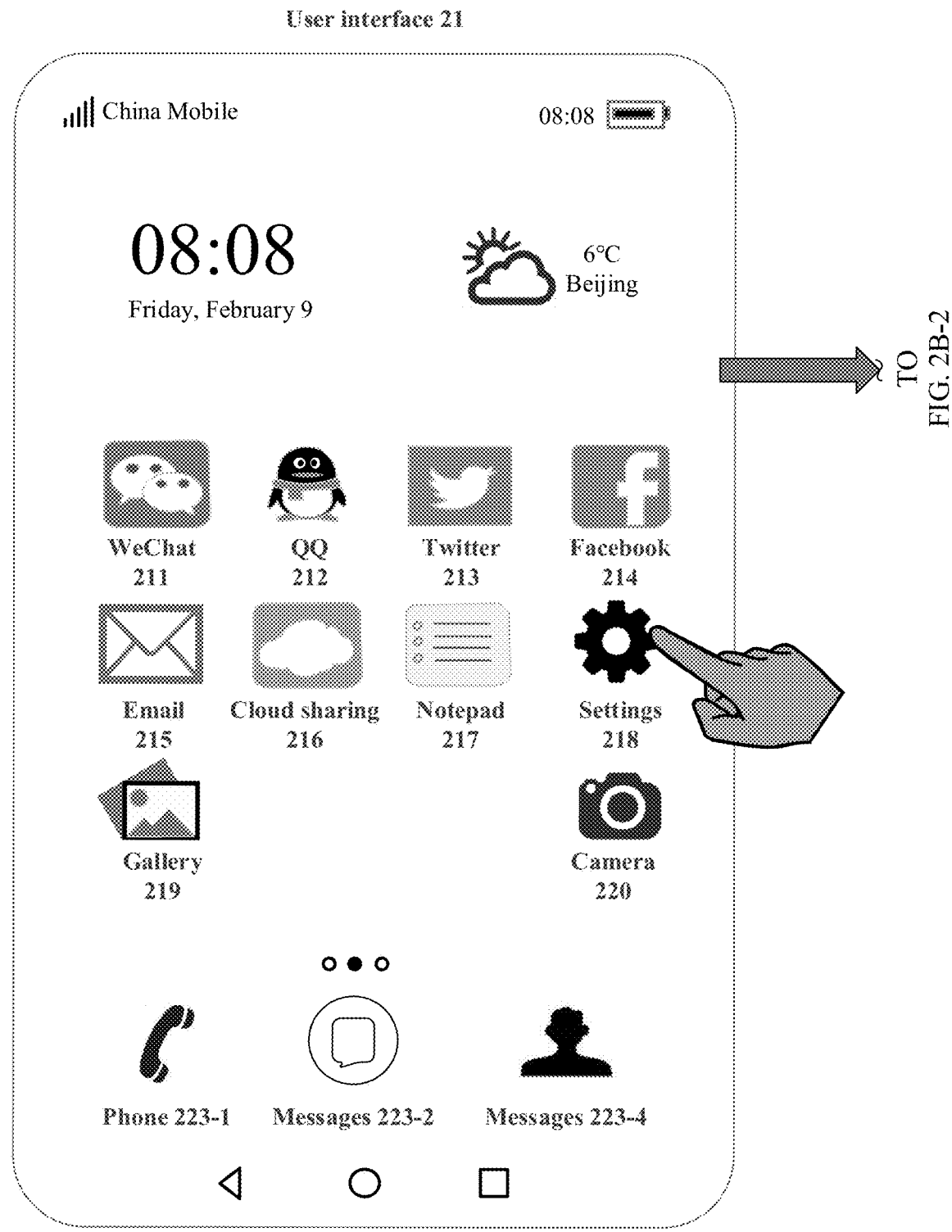
FIG. 2B-1 to FIG. 2B-3 and FIG. 2C are schematic diagrams of UIs for enabling "Power saving skin" on an electronic device according to an embodiment.

As shown in FIG. 2B-1, in the user interface 21, the electronic device 100 may detect a touch operation performed on the icon 218 of "Settings" (for example, a tap operation performed on the icon 218). In response to the operation, the electronic device 100 may display a user interface 22. A plurality of setting options are displayed in the user interface 22, for example, "WLAN", "Device connections", "Home screen & wallpaper", "Display", "Sounds", "Apps", "Battery", and "Storage", so that the user can perform network setting, device connection setting, display setting, application setting, sound setting, battery setting, storage setting, and the like on the electronic device.

Figures 2, 2B:
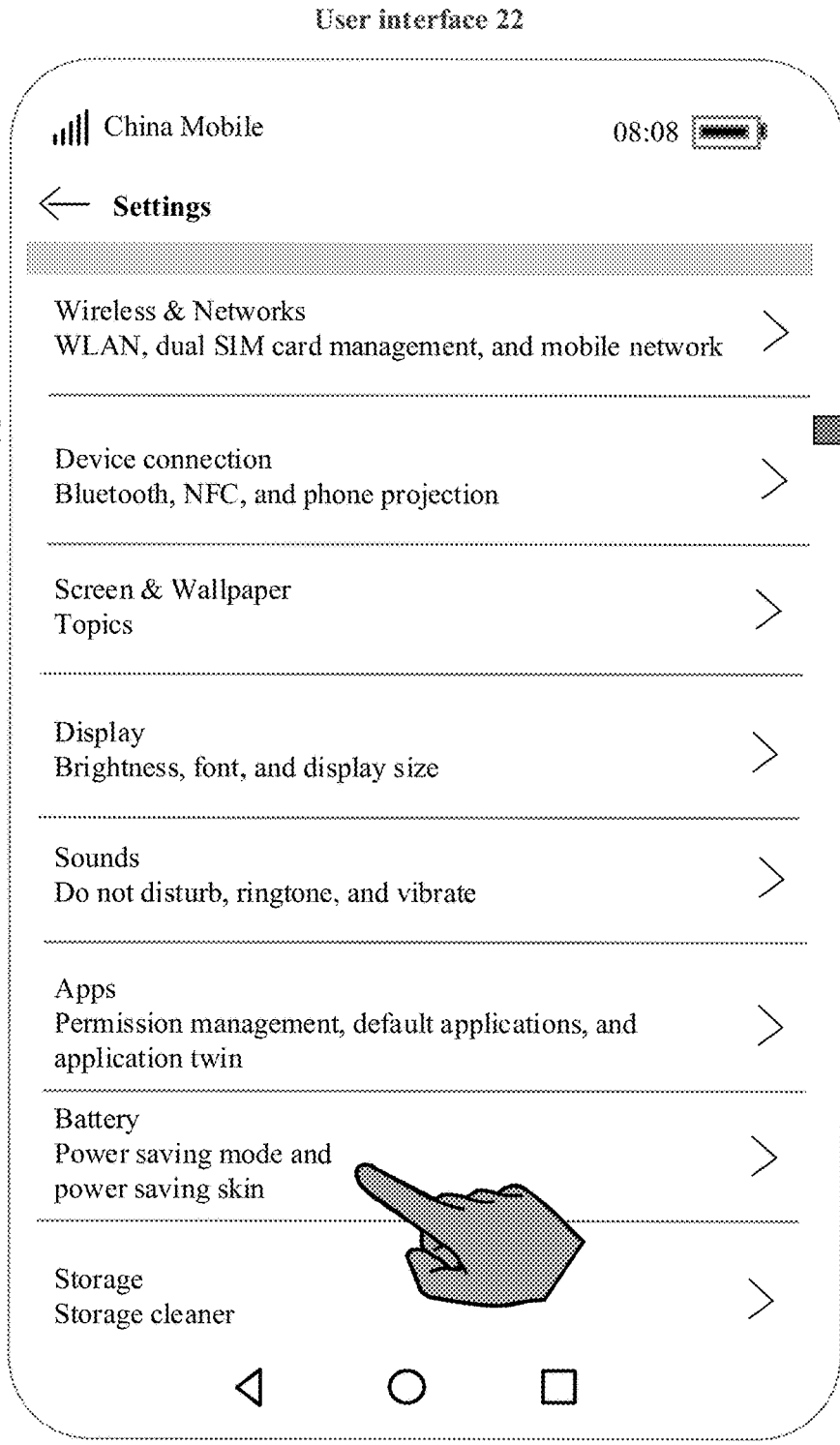
Figures 2, 2B, 3:
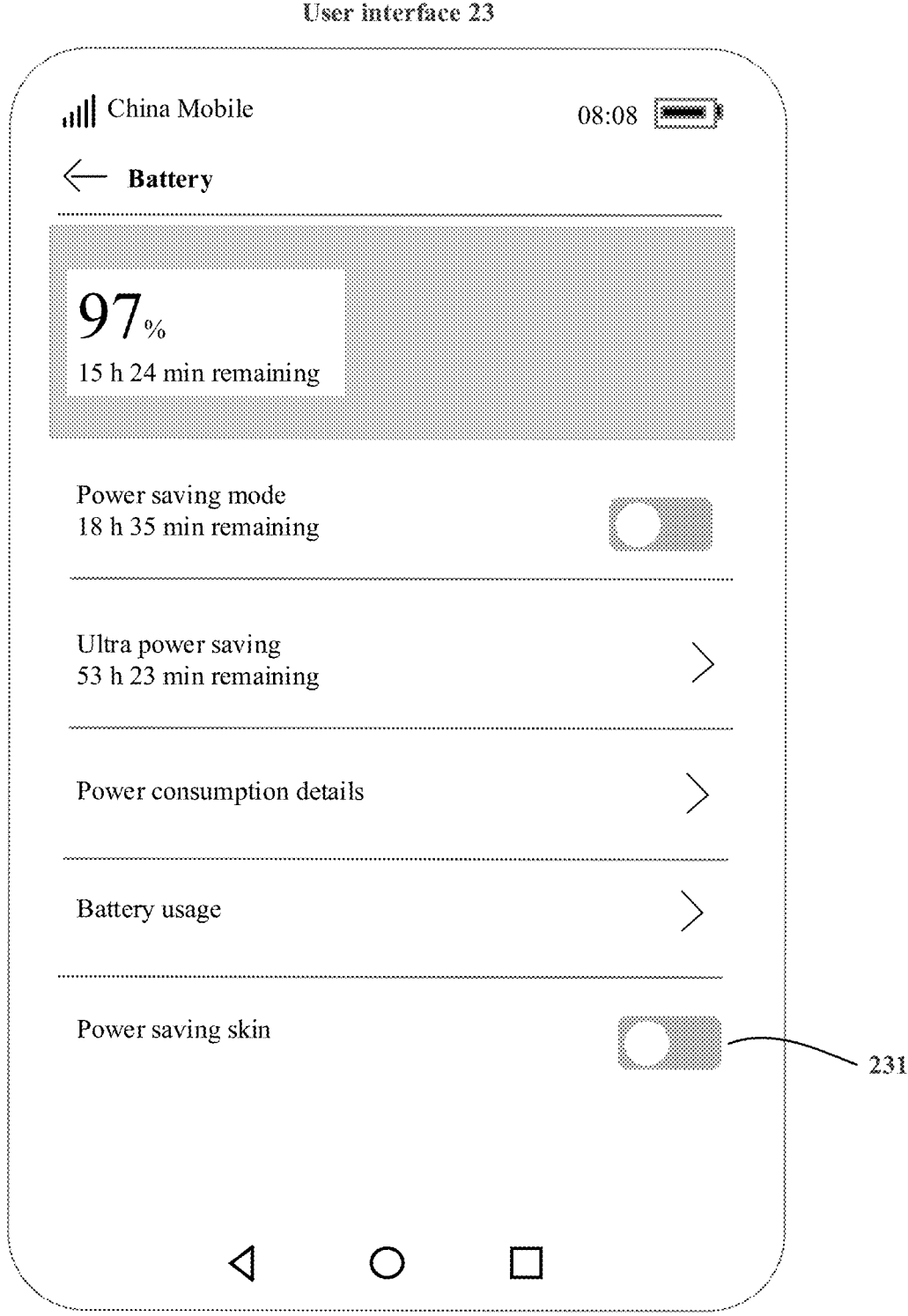

As shown in FIG. 2B-2, in the user interface 22, the electronic device 100 may detect a touch operation performed on the option "Battery" (for example, a tap operation performed on the option "Battery"). In response to the operation, the electronic device 100 may display a user interface 23. The user interface 23 may support the user in setting battery power consumption of the electronic device 100. The user interface 23 may display a control 231 used by the user to enable "Power saving skin". The control 231 may be a switch control. The control 231 may provide two options: enabling "Power saving skin" and disabling "Power saving skin".

Figure 2C:
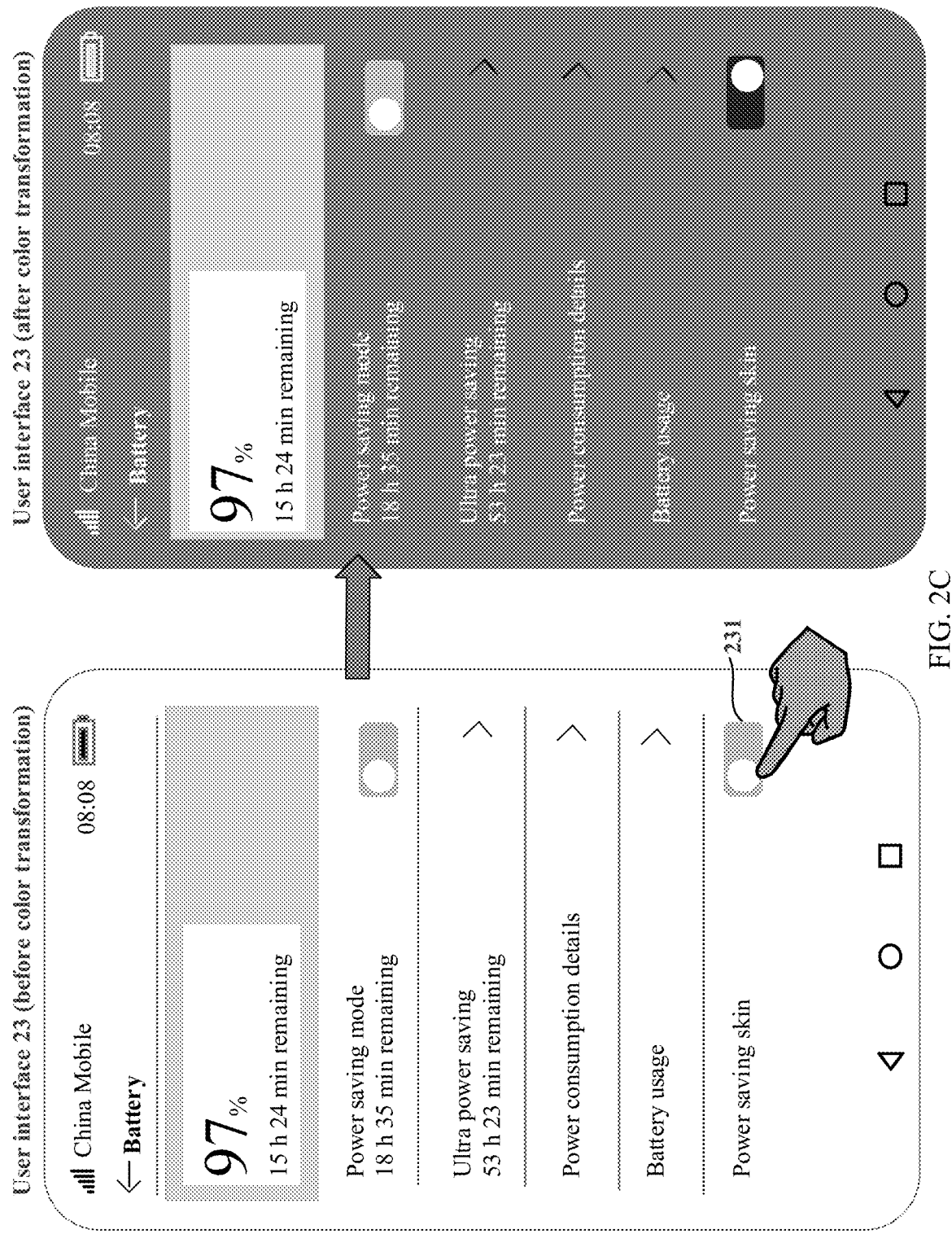

As shown in FIG. 2C, when detecting a user operation of selecting to enable "Power saving skin" by using the control 231, the electronic device 100 may enable "Power saving skin".

When "Power saving skin" is enabled, the electronic device 100 may perform color transformation on an interface element displayed on the display 194, and display, on the display 194, the interface element obtained after the color transformation. For example, as shown in FIG. 2C, after "Power saving skin" is enabled, the electronic device 100 may display, on the display 194, the user interface 23 obtained after the color transformation. In addition to the user interface 23, the interface element displayed on the display 194 may further include a user interface of another application. An interface element displayed on the display 194 before the color transformation and the interface element displayed on the display 194 after the color transformation may present different visual effects. The following method embodiments describe in detail how the electronic device 100 performs color transformation on an interface element displayed on the display 194. Details are not described herein.

Figure 2D:
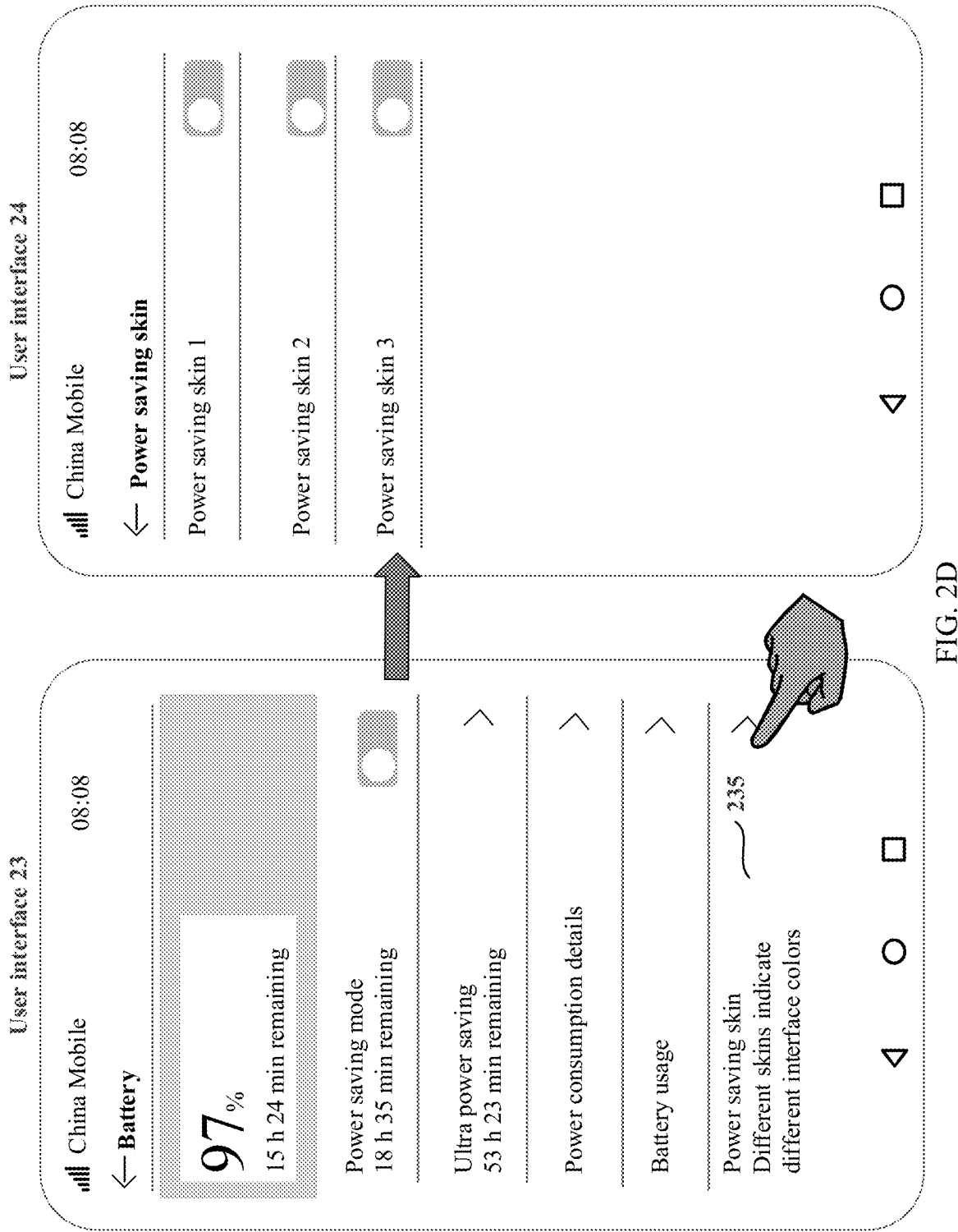
FIG. 2D is a schematic diagram of a UI for enabling "Power saving skin" on an electronic device according to another embodiment.

In an embodiment, "Settings (setting)" may provide one or more options for enabling "Power saving skin". The user interface 23 may be shown in FIG. 2D. When detecting a touch operation performed on an option 235 (for example, a tap operation performed on the option 235), the electronic device 100 may display a user interface 24. The user interface 24 may display one or more options used by the user to enable "Power saving skin", for example, "Power saving skin 1", "Power saving skin 2", and "Power saving skin 3". When detecting that the user selects one of the options, the electronic device 100 may enable "Power saving skin". Selecting different options to enable "Power saving skin" may mean performing different color transformations on the interface element displayed on the display 194. Herein, different color transformations may mean that the interface element has different colors after the color transformations are performed, because different options may indicate different color transformation effects. For example, "Power saving skin 1" may indicate that a color of the interface element of which a large area is used as the background on the display is transformed into black or to be close to black, and a color transformation effect is similar to transforming a theme into a black theme; and "Power saving skin 2" may indicate that a color of the interface element of which a large area is used as the background on the display is changed to dark green, and a color transformation effect is similar to transforming a theme into a green theme.

Figures 1, 3A:
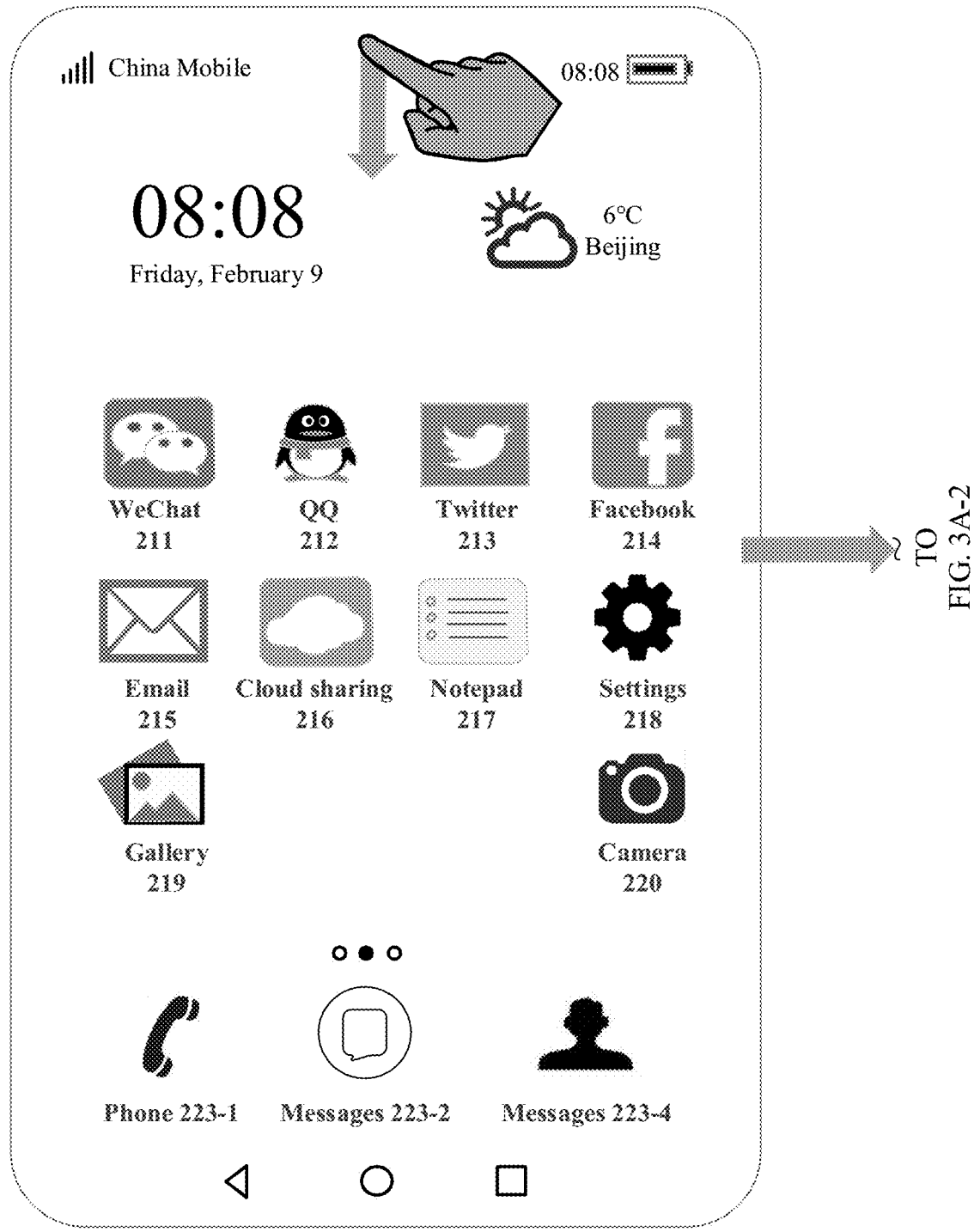
Figures 2, 3A:
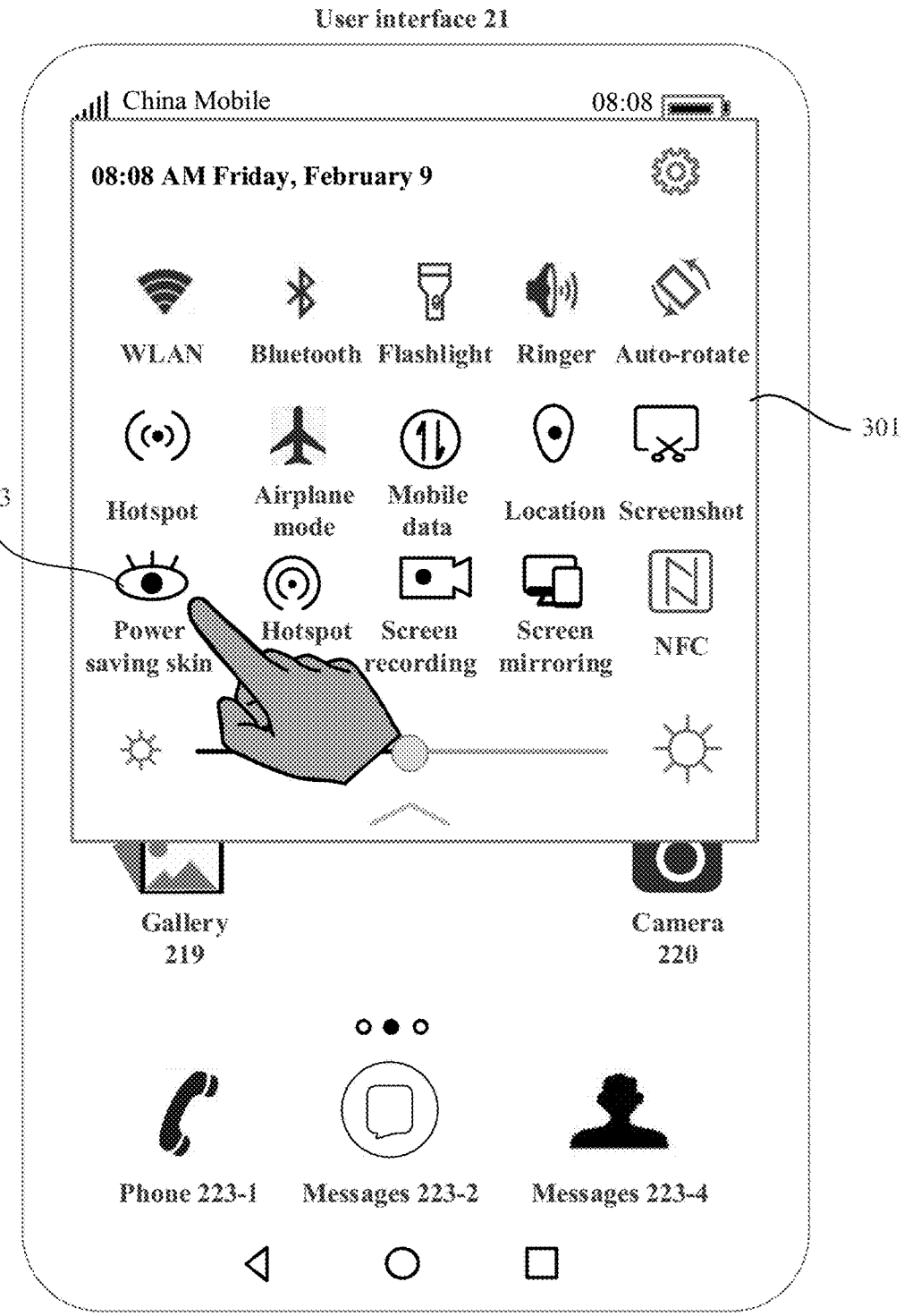
Figure 3B:
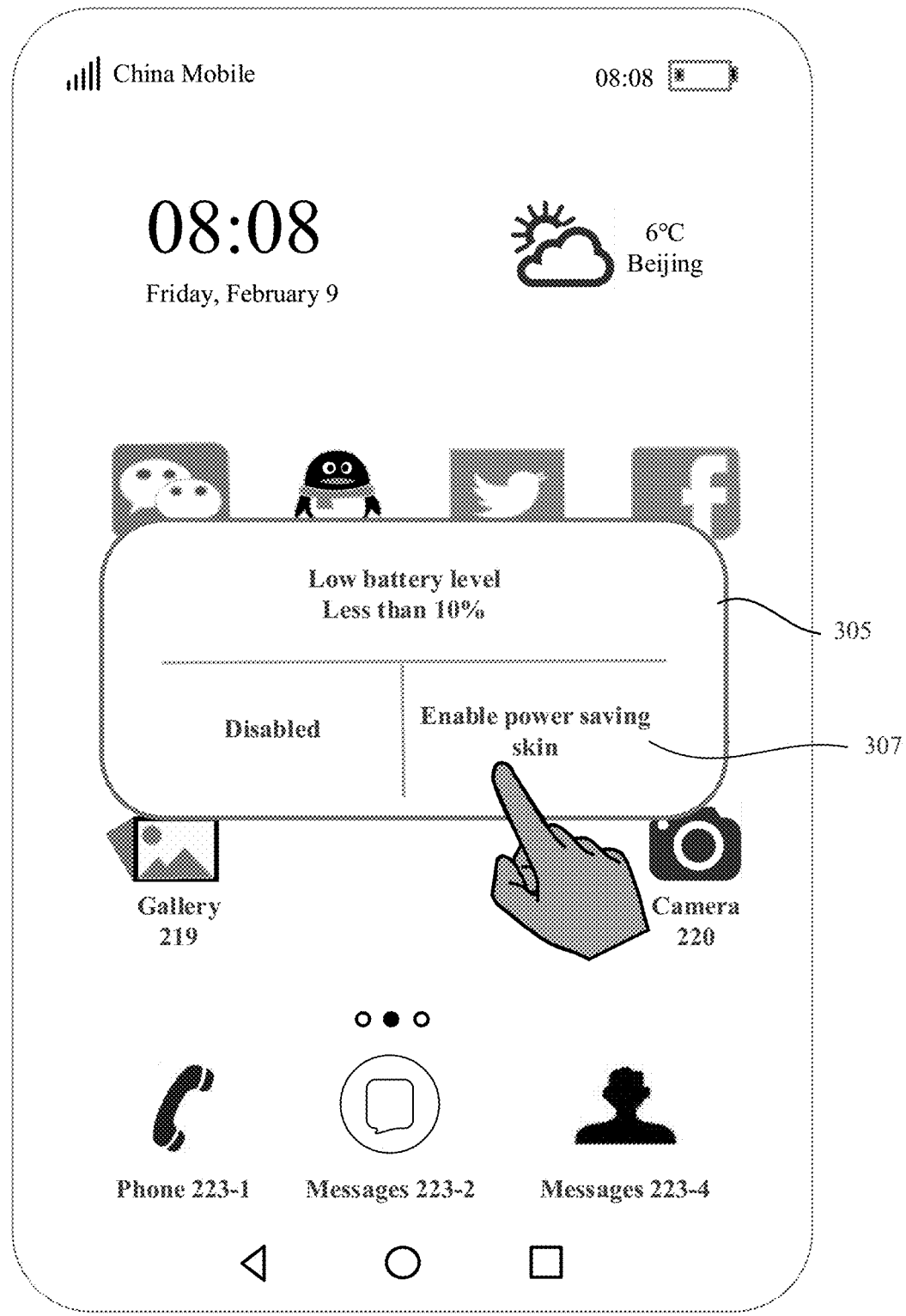

FIG. 2A to FIG. 2D show examples of the manner in which the user enables "Power saving skin" in "Settings". In addition to enabling "Power saving skin" in Settings, the user may also enable "Power saving skin" in another manner. For example, as shown in FIG. 3A-1, when detecting a downward swiping operation at the status bar 201, the electronic device 100 may display a window 301. The window 301 may display a control 303 for enabling "Power saving skin". In this way, the user may enable "Power saving skin" by tapping the control 303. For another example, as shown in FIG. 3B, when a remaining battery level of the electronic device 100 is less than a preset threshold (for example, 10%), the electronic device 100 may display a pop-up window 305. The pop-up window 305 may include a control 307 for enabling "Power saving skin". In this way, the user may enable "Power saving skin" by tapping the control 307.

Figure 4A:
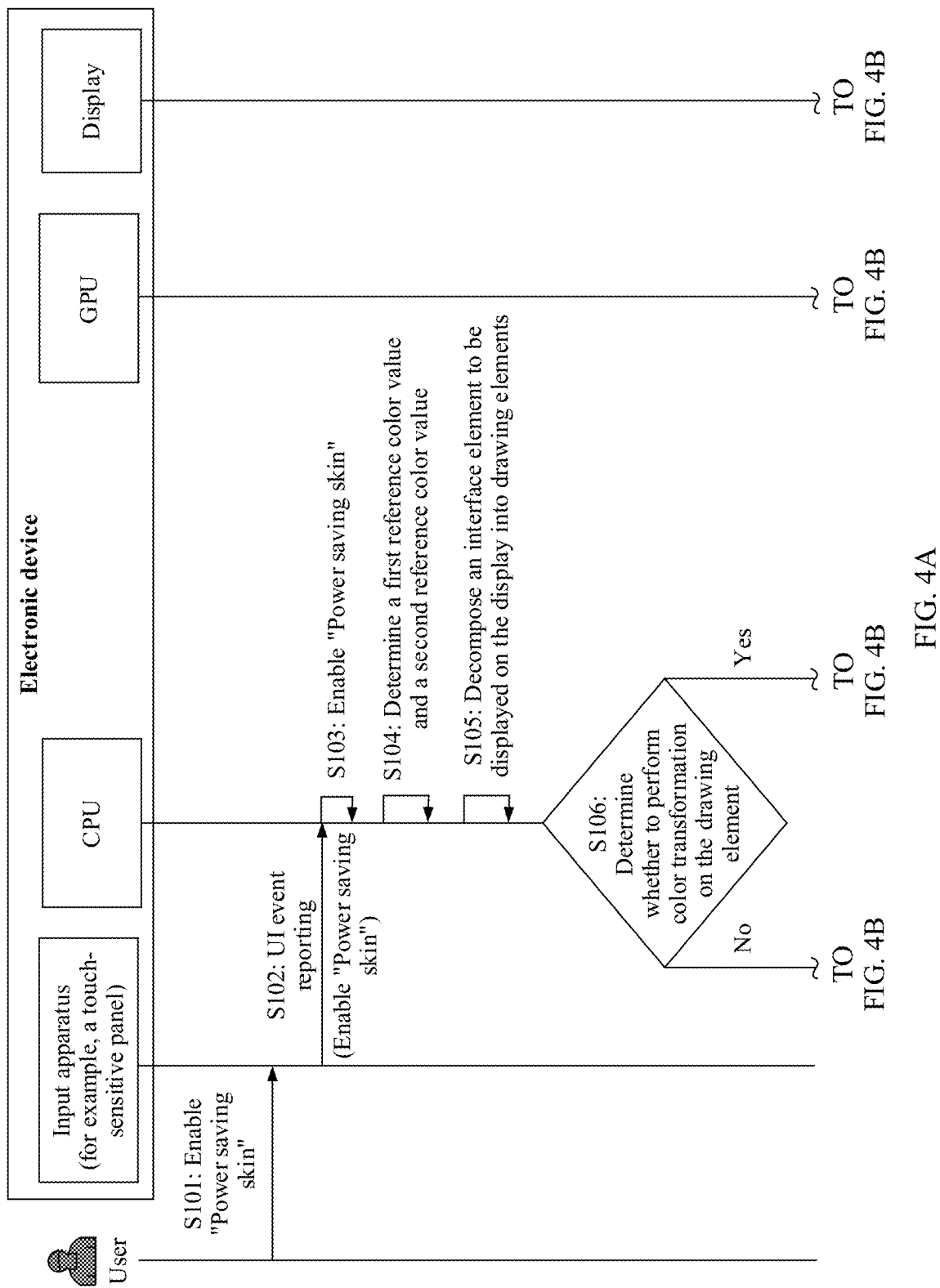
FIG. 4A and FIG. 4B are a schematic flowchart of a display method according to an embodiment of this application.
Figure 4B:
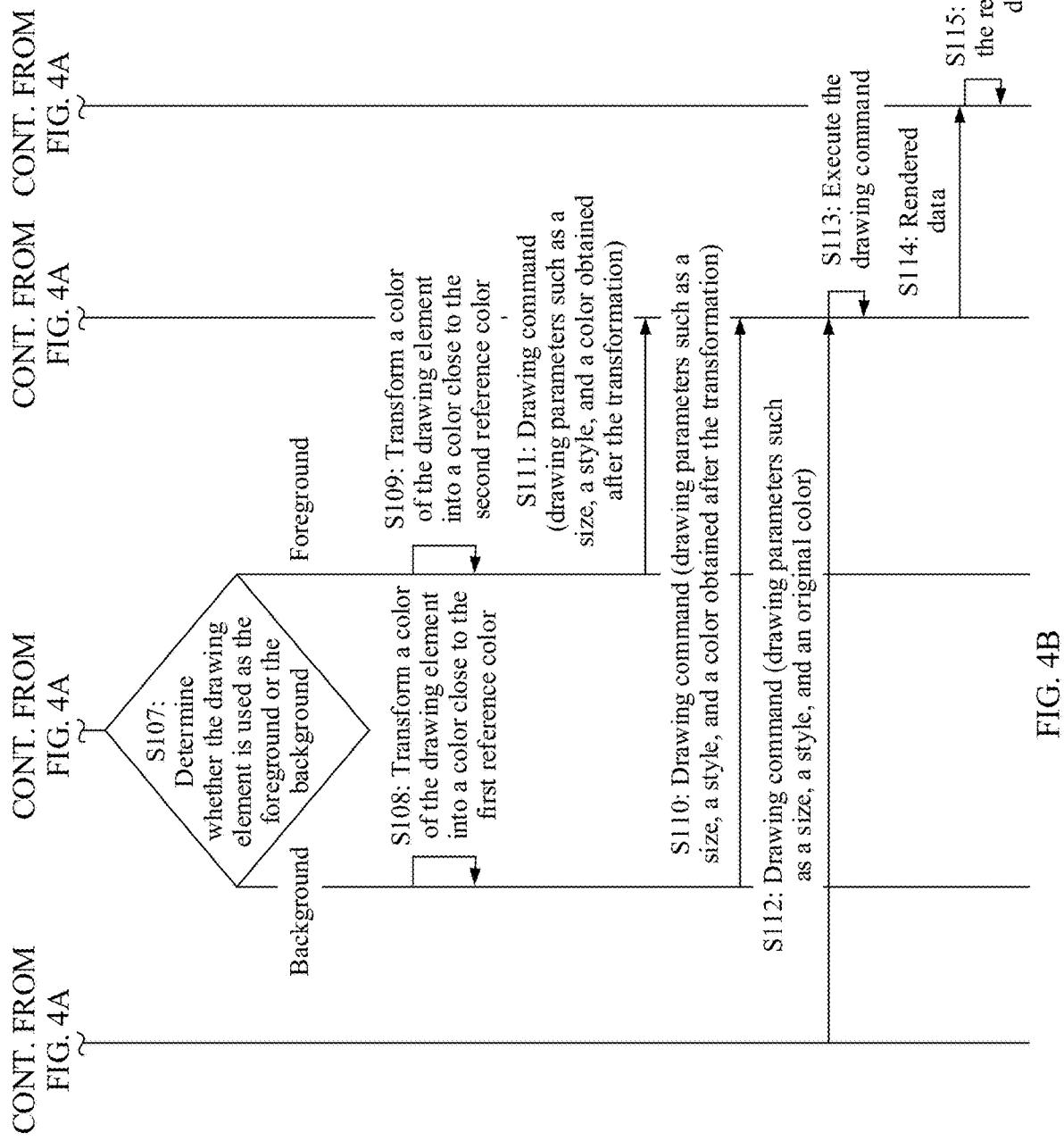

According to the foregoing embodiments, the following describes a display method applied to an electronic device provided in this application. As shown in FIG. 4A and FIG. 4B, the method may include the following phases.

Phase 1 (S101 to S103): Enable "Power saving skin".

In an embodiment, the electronic device may detect a user operation used to enable "Power saving skin". In response to the user operation, the electronic device may enable "Power saving skin". Herein, enabling "Power saving skin" may mean that the electronic device sets a value of a parameter indicating that "Power saving skin" is enabled to a value. The parameter may be stored in shared storage space, and the value (for example, 0XFFFF) may indicate that "Power saving skin" is enabled. In this way, the electronic device can read the value of the parameter when displaying an interface element. If the value is the foregoing value, it may be determined that "Power saving skin" is enabled, and subsequent operations are performed.

The user operation used to enable "Power saving skin" may be a touch operation detected by the electronic device by using a touch sensor (which may be integrated into a touchscreen). For information about how the electronic device detects the user operation, refer to the embodiments in FIG. 2A to FIG. 2D. Details are not described herein again. In addition to the touch operation collected by the touch sensor, the user operation used to enable "Power saving skin" may also be an audio input collected by the electronic device by using another input apparatus such as a microphone, for example, a voice instruction "Enable 'Power saving skin'".

In an embodiment, the electronic device may automatically enable "Power saving skin" without the user operation. For example, "Power saving skin" is automatically enabled when a remaining battery level of the electronic device is less than a battery level (for example, 30%).

Phase 2 (S104): Determine a color transformation reference point.

In an embodiment, the color transformation reference point may include a first reference color and a second reference color. The second reference color is different from the first reference color. In a subsequent color transformation phase (that is, Phase 3), the electronic device may transform a color of a drawing element used as the background into the first reference color or a color close to the first reference color, or may transform a color of a drawing element used as the foreground into the second reference color or a color close to the second reference color. Because the second reference color is different from the first reference color, different color transformations may be performed on the drawing elements used as the foreground and the background, so as to distinguish between the foreground and the background that are adjacent to each other and that are obtained after the color transformations. An embodiment of color transformation is described in subsequent operations. Details are not described herein.

In a user interface, the foreground and the background may have different features such as colors and sizes. The foreground may be formed by drawing elements with rich colors (such as red and yellow) and relatively small sizes, and the background may be formed by drawing elements with dull colors (such as black, white, and gray) and relatively large sizes. In an embodiment, whether a drawing element is used as the foreground or the background may be determined based on a feature parameter (such as a size or a color) of the drawing element. For details, refer to subsequent content (for example, S107). Details are not described herein.

In an embodiment, the electronic device may determine the first reference color based on a physical feature of the display. The first reference color may be a most power saving color of the display or a color close to the most power saving display color. Herein, the color close to the most power saving display color may be limited by using a condition that a color difference between the color and the most power saving color does not exceed a preset threshold. The physical feature (for example, a type of the display) of the display may be recorded in a configuration file of the electronic device. In addition to the most power saving color of the display and the color close to the most power saving display color, the first reference color may also be another color. Different types of displays may have different most power saving display colors and different most power consuming display colors. In an embodiment, in all colors that can be displayed on the display, power consumption generated when each color is displayed on the display in full screen for an equal time may be recorded, a display color with lowest power consumption is determined as a most power saving display color, and a display color with highest power consumption is determined as a most power consuming display color.

The second reference color is different from the first reference color. For example, the first reference color is black, and the second reference color is dark gray. A color difference between the second reference color and the first reference color is not limited in this application.

In some embodiments, the color transformation reference point may also be selected by a user. In the embodiment in FIG. 2D, the user interface 24 displays a plurality of options used by the user to enable "Power saving skin". Different options may represent different reference points, and that the user selects different options may indicate that the user selects different color transformation reference points. Herein, different color transformation reference points may include any one of the following cases: Only the first reference colors are different, only the second reference colors are different, or the first reference colors are different and the second reference colors are different. Because color transformation reference points are different, selecting different options indicates selecting different color transformations, and causes different color transformation effects. Different options may also represent resource files (for example, page layout files, or pictures, music, or texts referenced by interface source code) obtained after color transformation based on different reference points. If the user selects different options, it may indicate that the user selects different resource files, and different resource files present different visual effects in the user interface.

Example 1: It is assumed that, in the user interface 24 shown in FIG. 2D, "Power saving skin 1" indicates that the first reference color is black, and "Power saving skin 2" indicates that the first reference color is dark green. If the user selects "Power saving skin 1", it indicates that the user selects black as the first reference color. In this case, a color of an interface element of which a large area is used as the background on the display is transformed into to black or a color close to black, and a color transformation effect is similar to transforming a theme into a black theme. If the user selects "Power saving skin 2", it indicates that the user selects dark green as the first reference color. In this case, a color of an interface element of which a large area is used as the background on the display is transformed into dark green or a color close to dark green, and a color transformation effect is similar to transforming a theme into a green theme. Herein, the interface element of which the large area is used as the background on the display may be, for example, a list 501 (an "address book list") in FIG. 5.

Example 2: It is assumed that, in the user interface 24 shown in FIG. 2D, "Power saving skin 1" indicates that the first reference color is black and the second reference color is light gray, and "Power saving skin 2" indicates that the first reference color is black and the second reference color is yellow. If the user selects "Power saving skin 1", it indicates that the user selects black as the first reference color and light gray as the second reference color. In this case, a color of an interface element of which a large area is used as the background (for example, a large-area window) on the display is transformed into black or a color close to black, and a color of an interface element (for example, a button) used as the foreground is transformed into light gray or a color close to light gray. If the user selects "Power saving skin 2", it indicates that the user selects black as the first reference color and yellow as the second reference color. In this case, a color of an interface element of which a large area is used as the background (for example, a large-area window) on the display is transformed into black or a color close to black, and a color of an interface element (for example, a button) used as the foreground is transformed into yellow or a color close to yellow. A color transformation difference between "Power saving skin 1" and "Power saving skin 2" lies in that the interface element used as the foreground has different colors. Herein, the interface element of which the large area is used as the background on the display may be, for example, the list 501 ("address book list") in FIG. 5, and the interface element used as the foreground may be, for example, a button 505 or a button 509.

Phase 3 (S105 to S109): Color transformation.

S105: The electronic device may decompose an interface element to be displayed on the display into one or more of the following drawing elements: a geometric graph, a text, a picture, and the like. The interface element to be displayed on the display may be an interface element to be created by a UI thread of an application, and may be defined in interface source code of the UI thread of the application or in a resource file of a page layout.

S106: The electronic device may determine, based on a feature parameter such as a size or a color of a drawing element, whether to perform color transformation on the drawing element; and if color transformation needs to be performed, the electronic device may perform S107; or if color transformation does not need to be performed, the electronic device may determine to perform color fidelity on the drawing element, in other words, perform S112, to draw the drawing element based on an original color of the drawing element.

For example, an embodiment of determining, based on a feature parameter, whether to perform color transformation may include but is not limited to the following several manners:

Manner 1: If a size of the drawing element is less than a first size, the electronic device may determine to perform color fidelity on the drawing element; otherwise, the electronic device may determine to perform color transformation on the drawing element. A value of the first size is not limited in this application.

Manner 2: If the drawing element has a color in a color fidelity area, the electronic device may determine to perform color fidelity on the drawing element; otherwise, the electronic device may determine to perform color transformation on the drawing element. Herein, the color fidelity area may be a preset color set, for example, a set including colors other than black, white, and gray. A specification of the color fidelity area is not limited in this application.

Manner 3: If a quantity of colors of the drawing element exceeds a preset quantity, the electronic device may determine to perform color fidelity on the drawing element; otherwise, the electronic device may determine to perform color transformation on the drawing element. In this way, colors of an interface element including a drawing element with rich colors do not change, and rich information included in the rich colors of the interface element is not lost or changed. A value of the preset quantity is not limited in this application.

Figure 5:
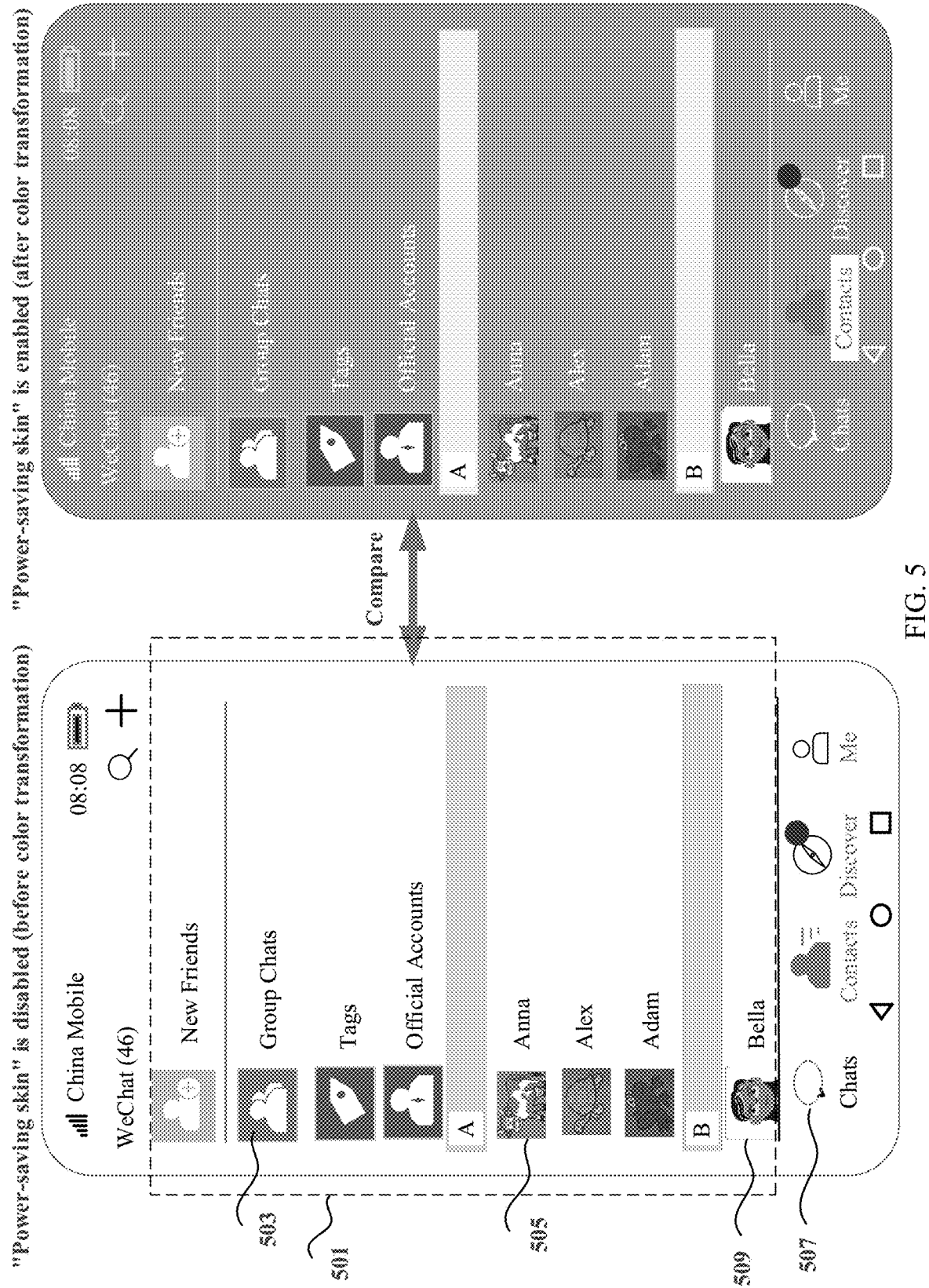
FIG. 5 is a schematic diagram of comparison between a user interface displayed before color transformation and a user interface displayed after color transformation.

In an embodiment, if the drawing element is a geometric graph, Manner 1 may be used to determine whether to perform color transformation. For different geometric graphs, there may be different first sizes. For example, as shown in FIG. 5, a drawing element forming a shape of the list 501 (the "address book list") is a geometric graph: a rectangle, and an original color of the rectangle is white. Because a size of the rectangle is relatively large, color transformation may be performed on the rectangle. This is not limited, and Manner 2 and/or Manner 3 may also be used to determine whether to perform color transformation on the drawing element that is a geometric graph.

In an embodiment, if the drawing element is a picture, Manner 2 and/or Manner 3 may be used to determine whether to perform color transformation. For example, as shown in FIG. 5, a drawing element that fills an icon 503 is a picture, and original colors of the drawing element include green and white. It is assumed that the color fidelity area is a set including colors other than black, white, and gray. In this case, because the original colors of the picture are included in the color fidelity area, it may be determined that color fidelity needs to be performed on the picture. For another example, as shown in FIG. 5, a drawing element that fills an icon 505 is a picture, and original colors of the drawing element include a plurality of colors such as green, white, and yellow. It is assumed that the color fidelity area is a set including colors other than black, white, and gray. In this case, because the original colors of the picture are included in the color fidelity area, and a quantity of colors of the icon exceeds a preset quantity (for example, 2), it may be determined that color fidelity needs to be performed on the picture.

If the drawing element is a picture, whether to perform color transformation may be alternatively determined in the following manner: If a proportion of transparent points in the picture exceeds a preset proportion (for example, 70%), it may be determined that color transformation needs to be performed on the picture; otherwise, it may be determined that color fidelity needs to be performed on the picture. For example, as shown in FIG. 5, a drawing element that fills an icon 507 is a picture, and a proportion of transparent points of the drawing element exceeds the preset proportion (for example, 70%). Therefore, it may be determined that color transformation needs to be performed on the picture. For another example, as shown in FIG. 5, a drawing element that fills the icon 509 is a picture, and a proportion of transparent points of the drawing element is less than the preset proportion (for example, 70%). Therefore, it may be determined that color fidelity needs to be performed on the picture.

In an embodiment, if the drawing element is a text, Manner 2 and/or Manner 3 may be used to determine whether to perform color transformation, or it may be directly determined that color transformation needs to be performed on the text.

In the foregoing descriptions, using Manner 2 and Manner 3 means that, if the drawing element has a color in the color fidelity area, and the quantity of colors of the drawing element exceeds the quantity, the electronic device may determine to perform color fidelity on the drawing element; otherwise, the electronic device may determine to perform color transformation on the drawing element.

S107: When determining to perform color transformation on the drawing element, the electronic device may determine, based on the feature parameter such as the size or the color of the drawing element, whether the drawing element is used as the foreground or the background; and if the drawing element is used as the background, the electronic device may perform S108; or if the drawing element is used as the foreground, the electronic device may perform S109.

In an embodiment, if the drawing element is a geometric graph, whether the geometric graph is used as the foreground or the background may be determined based on a size of the geometric graph. If the size of the geometric graph exceeds a second size, the electronic device may determine that the geometric graph is used as the background; otherwise, the electronic device may determine that the geometric graph is used as the foreground. For example, as shown in FIG. 5, the drawing element that fills the control 507 may be a geometric graph. Because a size of the geometric graph is relatively small (that is, does not exceed the second size), it may be determined that the geometric graph is used as the foreground.

In an embodiment, a drawing element that is a text and a drawing element that is a picture usually each may be used as the foreground.

In addition to the implementations described in the foregoing content, the electronic device may further determine, through artificial intelligence, whether to perform color transformation on the drawing element, and determine whether the drawing element on which color transformation needs to be performed is used as the foreground or the background. For example, the electronic device may use a convolutional neural network. An input of the convolutional neural network may be the feature parameter such as the size of the color of the drawing element. An output of the convolutional neural network may include the following results: 1. No color transformation is performed on the drawing element; 2. Color transformation is performed on the drawing element and the drawing element is used as the background; and 3. Color transformation is performed on the drawing element and the drawing element is used as the background. The electronic device may train the convolutional neural network by using a large amount of training data. The training data may include two parts: the feature parameter of the drawing element and a known result corresponding to the drawing element. The known result may include the following several results: 1. No color transformation is performed on the drawing element; 2. Color transformation is performed on the drawing element and the drawing element is used as the background; and 3. Color transformation is performed on the drawing element and the drawing element is used as the background. The known result may be a manual determining result or a determining result obtained in another manner. This is not limited herein.

S108: If the drawing element is used as the background, the electronic device may transform a color of the drawing element into a first color area. A color difference between a color in the first color area and the first reference color does not exceed a first value. In other words, if the drawing element is used as the background, the electronic device may transform the color of the drawing element into a color close to the first reference color.

Because the first reference color may be the most power saving display color of the display of the electronic device or may be a color close to the most power saving display color, transforming the color of the drawing element into the first color area can significantly reduce power consumption of the electronic device.

S109: If the drawing element is used as the foreground, the electronic device may transform a color of the drawing element into a second color area. A color difference between a color in the second color area and the second reference color does not exceed a second value. The second value and the first value may be the same, or may be different. In other words, if the drawing element is used as the foreground, the electronic device may transform the color of the drawing element to a color close to the second reference color.

The second reference color is different from the first reference color. Therefore, different color transformations may be performed on drawing elements used as the foreground and the background, so as to distinguish between the foreground and the background that are adjacent to each other and that are obtained after the color transformations.

In an embodiment, the electronic device may perform linear transformation to transform the color of the drawing element used as the foreground into the first color area, or may perform linear transformation to transform the color of the drawing element used as the background into the second color area. A algorithm for the linear transformation is not limited in this application.

Phase 4 (S110 to S113): Draw the drawing element.

S110 to S112: The electronic device may generate a drawing command used to draw the drawing element. The drawing command may carry drawing parameters such as a size, a style, and a color. These drawing parameters may be used by the electronic device (which may be a GPU in the electronic device) to draw the drawing element.

Referring to S110, for a drawing element on which color transformation needs to be performed, if the drawing element is used as the background, a drawing color indicated by a color parameter carried in the drawing command is the color obtained after the color transformation that is determined in S108.

Referring to S111, for a drawing element on which color transformation needs to be performed, if the drawing element is used as the foreground, a drawing color indicated by a color parameter carried in the drawing command is the color obtained after the color transformation that is determined in S109.

Referring to S112, for a drawing element on which color fidelity needs to be performed, a drawing color indicated by a color parameter carried in the drawing command is an original color of the drawing element.

S113: The electronic device (which may be the GPU in the electronic device) may draw the drawing element according to the drawing command, to obtain rendered data.

Finally, referring to S114, the electronic device may display the rendered data, that is, display the drawing element on the display.

In an embodiment, if color transformation needs to be performed on the drawing element, and the drawing element is used as the background, a color of the drawing element displayed on the display is the color obtained after the color transformation that is determined in S108. If color transformation needs to be performed on the drawing element, and the drawing element is used as the foreground, a color of the drawing element displayed on the display is the color obtained after the color transformation that is determined in S109. In this way, a display color of the interface element including the drawing element also changes.

In addition, if color fidelity needs to be performed on the drawing element, a color of the drawing element displayed on the display is an original color of the drawing element.

In the method described in FIG. 4A and FIG. 4B, S103 to S113 may be jointly performed by the CPU and the GPU. As shown in FIG. 4A and FIG. 4B, S103 to S112 may be performed by the CPU, and S113 may be performed by the GPU. In other words, the CPU generates a drawing command, and the GPU is responsible for rendering. In some optional embodiments, S103 to S113 may be all performed by the CPU, or may be all performed by the GPU.

In the method described in FIG. 4A and FIG. 4B, after performing Phase 3 (S105 to S109), for the interface element to be displayed on the display, the electronic device may generate a resource file based on a drawing element that is obtained after the color transformation and forms the interface element (for example, a drawing element that constitutes a control such as a button or a list in the user interface), and store the resource file. In this way, when displaying the interface element again, the electronic device may directly perform rendering and displaying based on the generated resource file, and does not need to perform color transformation on the drawing element that constitutes the interface element again. This can simplify an operation.

By implementing the method described in FIG. 4A and FIG. 4B, color transformation may be performed on the interface element to be displayed on the display, and color transformation may be performed on a reference point determined based on the physical feature of the display, so that the display color of the interface element of which the large area is used as the background can be transformed into a relatively power saving display color of the display. This can reduce power consumption of the display. In addition, in a color transformation process, color fidelity is performed on (in other words, no color transformation is performed on) a drawing element that includes rich information (for example, rich colors), so that rich meanings represented by the drawing element can be preserved. In addition, different color transformations are performed on drawing elements used as the foreground and the background, so as to distinguish between the foreground and the background that are adjacent to each other and that are obtained after the color transformations.

The foregoing descriptions are merely some embodiments of the application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A display method applied to an electronic device with a display, the method comprising:
   displaying a first user interface on the display, wherein the first user interface comprises an icon associated with an application "Phone", an icon associated with an application "Messages", an icon associated with "Settings", and an icon associated with a communication application;
   detecting a first user operation performed on the icon associated with the communication application;
   displaying a second user interface on the display in response to detecting the first user operation, wherein the second user interface comprises a plurality of contact options, a first tab displayed at a bottom of the plurality of contact options, a signal strength indicator of a mobile communication signal, a time indicator, and a battery status indicator; wherein each contact option comprises a profile picture and a name; wherein the first tab has a first corner mark; wherein a background of the second user interface is displayed in a first color; wherein the name of the contact option is displayed in a second color; wherein the first corner mark is displayed in a third color; and wherein the signal strength indicator of the mobile communication signal, the time indicator, and the battery status indicator are displayed in a fourth color;
   detecting a second user operation;
   displaying the first user interface on the display in response to detecting the second user operation;
   detecting a third user operation performed on the icon associated with "Settings";
   displaying a third user interface on the display in response to detecting the third user operation, wherein the third user interface comprises a first setting option, the signal strength indicator of the mobile communication signal, the time indicator, and the battery status indicator; wherein the first setting option comprises a first switch control; wherein a background of the third user interface is displayed in the first color; wherein the signal strength indicator of the mobile communication signal, the time indicator, and the battery status indicator are displayed in the fourth color; and wherein a name of the first setting option is displayed in the second color;
   detecting a fourth user operation performed on the first switch control;
   displaying the third user interface on the display in response to detecting the fourth user operation, wherein the background of the third user interface is displayed in a fifth color; the signal strength indicator of the mobile communication signal, the time indicator, and the battery status indicator are displayed in a sixth color; and wherein the name of the first setting option is displayed in a seventh color;
   detecting a fifth user operation; and
   displaying the first user interface on the display in response to detecting the fifth user operation;
   detecting a sixth user operation performed on the icon associated with the communication application; and
   displaying the second user interface on the display in response to detecting the sixth user operation, wherein the background of the second user interface is displayed in the fifth color; the signal strength indicator of the mobile communication signal, the time indicator, and the battery status indicator are displayed in the sixth color; wherein the name of the contact option is displayed in the seventh color; and wherein the first corner mark is displayed in the third color, wherein the fifth color is different from the first color, the sixth color is different from the fourth color, and the seventh color is different from the second color.

2. The method according to claim 1, wherein the fifth color is a most power saving color of the display, or a color difference between the fifth color and a most power saving color of the display is less than or equal to a first preset threshold, or a color difference between the fifth color and a most power saving color of the display is less than a color difference between the first color and the most power saving color of the display.

3. The method according to claim 1, wherein the first color is white.

4. The method according to claim 1, wherein the fifth color is black.

5. The method according to claim 1, wherein the fourth color is the same as the second color.

6. The method according to claim 1, wherein the fourth color is the same as the fifth color, or the second color is the same as the fifth color.

7. The method according to claim 1, wherein the sixth color is the same as the seventh color.

8. The method according to claim 1, wherein the sixth color is the same as the first color, or the seventh color is the same as the first color.

9. The method according to claim 1, wherein the third color comprises red.

10. The method according to claim 1, wherein the first corner mark is used to indicate a new message or a new activity received by the communication application.

11. The method according to claim 1, wherein the first user interface further comprises the signal strength indicator of the mobile communication signal, the time indicator, and the battery status indicator, wherein
- before the fourth user operation is detected, the signal strength indicator of the mobile communication signal, the time indicator, and the battery status indicator on the first user interface are displayed in an eighth color; and
- after the fourth user operation is detected, the signal strength indicator of the mobile communication signal, the time indicator, and the battery status indicator on the first user interface are displayed in a ninth color.

12. The method according to claim 11, wherein the eighth color and the ninth color are the same as the sixth color.

13. The method according to claim 11, wherein the eighth color is the same as the fourth color, and the ninth color is the same as the sixth color.

14. The method according to claim 11, wherein the first user interface further comprises a system navigation button, wherein
- before the fourth user operation is detected, the system navigation button is displayed on the first user interface in the eighth color; and
- after the fourth user operation is detected, the system navigation button is displayed on the first user interface in the ninth color.

15. The method according to claim 1, wherein the third user interface further comprises a system navigation button, wherein
- before the fourth user operation is detected, the system navigation button is displayed on the third user interface in the fourth color; or
- before the fourth user operation is detected, the system navigation button is displayed on the third user interface in the sixth color.

16. The method according to claim 1, wherein the second user interface further comprises a system navigation button, wherein
- before the fourth user operation is detected, the system navigation button is displayed on the second user interface in the fourth color; or
- before the fourth user operation is detected, the system navigation button is displayed on the second user interface in the sixth color.

17. The method according to claim 1, wherein the fifth color is obtained by changing the first color based on a first reference color, the fifth color is in a first color area, and a color difference between a color in the first color area and the first reference color does not exceed a first value; and
- wherein the sixth color is obtained by changing the fourth color based on a second reference color, wherein the seventh color is obtained by changing the second color based on the second reference color, wherein the sixth color and the seventh color are in a second color area, wherein a color difference between a color in the second color area and the second reference color does not exceed a second value, and wherein the second reference color is different from the first reference color.

18. The method according to claim 1, further comprising:
- detecting a seventh user operation performed on a contact tab on the second user interface; and
- displaying a chat interface of a contact associated with the contact tab.

19. The method according to claim 1, wherein after the detecting the third user operation and before the displaying the third user interface, the method further comprises:
- displaying a fourth user interface on the display, wherein the fourth user interface comprises a battery-related setting option or a display-related setting option, or the fourth user interface comprises the battery-related setting option and the display-related setting option; wherein a background of the fourth user interface is displayed in the first color; and wherein a name of the battery-related setting option and a name of the display-related setting option are displayed in the second color;
- detecting an eighth user operation performed on the battery-related setting option or the display-related setting option; and
- displaying the third user interface on the display, wherein the background of the third user interface is displayed in the first color; the signal strength indicator of the mobile communication signal, the time indicator, and the battery status indicator are displayed in the fourth color; and
- wherein the name of the first setting option is displayed in the second color.

20. An electronic device, comprising:
a processor,
a memory coupled to the processor to store instructions, which when executed by the processor, cause the processor to perform operations, the operations comprising:
displaying a first user interface on a display, wherein the first user interface comprises an icon associated with an application "Phone", an icon associated with an application "Messages", an icon associated with "Settings", and an icon associated with a communication application;
detecting a first user operation performed on the icon associated with the communication application;
displaying a second user interface on the display in response to detecting the first user operation, wherein the second user interface comprises a plurality of contact options, a first tab displayed at a bottom of the plurality of contact options, a signal strength indicator of a mobile communication signal, a time indicator, and a battery status indicator; wherein each contact option comprises a profile picture and a name; wherein the first tab has a first corner mark; wherein a background of the second user interface is displayed in a first color; wherein the name of the contact option is displayed in a second color; wherein the first corner mark is displayed in a third color; and wherein the signal strength indicator of the mobile communication signal, the time indicator, and the battery status indicator are displayed in a fourth color;
detecting a second user operation;
displaying the first user interface on the display in response to detecting the second user operation;
detecting a third user operation performed on the icon associated with "Settings";

displaying a third user interface on the display in response to detecting the third user operation, wherein the third user interface comprises a first setting option, the signal strength indicator of the mobile communication signal, the time indicator, and the battery status indicator; wherein the first setting option comprises a first switch control; wherein a background of the third user interface is displayed in the first color; wherein the signal strength indicator of the mobile communication signal, the time indicator, and the battery status indicator are displayed in the fourth color; and wherein a name of the first setting option is displayed in the second color;

detecting a fourth user operation performed on the first switch control;

displaying the third user interface on the display in response to detecting the fourth user operation, wherein the background of the third user interface is displayed in a fifth color; the signal strength indicator of the mobile communication signal, the time indicator, and the battery status indicator are displayed in a sixth color; and wherein the name of the first setting option is displayed in a seventh color;

detecting a fifth user operation; and displaying the first user interface on the display in response to detecting the fifth user operation;

detecting a sixth user operation performed on the icon associated with the communication application; and displaying the second user interface on the display in response to detecting the sixth user operation, wherein the background of the second user interface is displayed in the fifth color; the signal strength indicator of the mobile communication signal, the time indicator, and the battery status indicator are displayed in the sixth color; wherein the name of the contact option is displayed in the seventh color; and wherein the first corner mark is displayed in the third color, wherein the fifth color is different from the first color, the sixth color is different from the fourth color, and the seventh color is different from the second color.

21. A non-transitory machine-readable medium having instructions stored therein, which when executed by a processor, cause the processor to perform operations, the operations comprising:

displaying a first user interface on a display, wherein the first user interface comprises an icon associated with an application "Phone", an icon associated with an application "Messages", an icon associated with "Settings", and an icon associated with a communication application;

detecting a first user operation performed on the icon associated with the communication application;

displaying a second user interface on the display in response to detecting the first user operation, wherein the second user interface comprises a plurality of contact options, a first tab displayed at the a bottom of the plurality of contact options, a signal strength indicator of a mobile communication signal, a time indicator, and a battery status indicator; wherein each contact option comprises a profile picture and a name; wherein the first tab has a first corner mark; wherein a background of the second user interface is displayed in a first color; wherein the name of the contact option is displayed in a second color; wherein the first corner mark is displayed in a third color; and wherein the signal strength indicator of the mobile communication signal, the time indicator, and the battery status indicator are displayed in a fourth color;

detecting a second user operation;

displaying the first user interface on the display in response to detecting the second user operation;

detecting a third user operation performed on the icon associated with "Settings";

displaying a third user interface on the display in response to detecting the third user operation, wherein the third user interface comprises a first setting option, the signal strength indicator of the mobile communication signal, the time indicator, and the battery status indicator; wherein the first setting option comprises a first switch control; wherein a background of the third user interface is displayed in the first color; wherein the signal strength indicator of the mobile communication signal, the time indicator, and the battery status indicator are displayed in the fourth color; and wherein a name of the first setting option is displayed in the second color;

detecting a fourth user operation performed on the first switch control;

displaying the third user interface on the display in response to detecting the fourth user operation, wherein the background of the third user interface is displayed in a fifth color; the signal strength indicator of the mobile communication signal, the time indicator, and the battery status indicator are displayed in a sixth color; and wherein the name of the first setting option is displayed in a seventh color;

detecting a fifth user operation; and displaying the first user interface on the display in response to detecting the fifth user operation;

detecting a sixth user operation performed on the icon associated with the communication application; and displaying the second user interface on the display in response to detecting the sixth user operation, wherein the background of the second user interface is displayed in the fifth color; the signal strength indicator of the mobile communication signal, the time indicator, and the battery status indicator are displayed in the sixth color; wherein the name of the contact option is displayed in the seventh color; and wherein the first corner mark is displayed in the third color, wherein the fifth color is different from the first color, the sixth color is different from the fourth color, and the seventh color is different from the second color.

* * * * *